(12) United States Patent
Reichman

(10) Patent No.: US 12,363,274 B1
(45) Date of Patent: Jul. 15, 2025

(54) CAMERA MONITORING SYSTEMS AND METHODS

(71) Applicant: Security Camera Maintenance Company, Las Vegas, NV (US)

(72) Inventor: Daniel Reichman, Las Vegas, NV (US)

(73) Assignee: Security Camera Maintenance Company, Las Vegas, NV (US)

( * ) Notice: Subject to any disclaimer, the term of this patent is extended or adjusted under 35 U.S.C. 154(b) by 0 days.

(21) Appl. No.: 19/051,043

(22) Filed: Feb. 11, 2025

Related U.S. Application Data

(63) Continuation of application No. 18/980,331, filed on Dec. 13, 2024.

(60) Provisional application No. 63/682,150, filed on Aug. 12, 2024.

(51) Int. Cl.
  *H04N 17/00* (2006.01)
  *G08B 13/196* (2006.01)
  *H04N 7/18* (2006.01)

(52) U.S. Cl.
  CPC ..... *H04N 17/002* (2013.01); *G08B 13/19656* (2013.01); *G08B 13/19682* (2013.01); *G08B 13/19691* (2013.01); *H04N 7/181* (2013.01)

(58) Field of Classification Search
  CPC ........ H04N 17/002; H04N 7/18; H04N 7/181; G08B 13/19656; G08B 13/19682; G08B 13/19691
  USPC .................................................. 348/187, 180
  See application file for complete search history.

(56) References Cited

U.S. PATENT DOCUMENTS

| | | | | |
|---|---|---|---|---|
| 10,523,689 B2 * | 12/2019 | Decenzo | ................ | H04L 63/02 |
| 10,652,503 B2 * | 5/2020 | Dozier | ................... | H04N 5/772 |
| 10,674,204 B2 | 6/2020 | Kouncar | | |
| 10,681,574 B2 | 6/2020 | Dion et al. | | |
| 11,010,864 B2 * | 5/2021 | Takami | ................... | G02B 13/06 |
| 11,082,665 B2 | 8/2021 | Galvin et al. | | |
| 11,146,470 B2 | 10/2021 | Gunasekara et al. | | |
| 11,308,776 B2 | 4/2022 | Renkis | | |
| 2007/0199076 A1 * | 8/2007 | Rensin | ............... | H04N 21/2743 |
| | | | | 726/27 |

(Continued)

OTHER PUBLICATIONS

SecuriThings, Enterprise Solution—Enterprise Platform, downloaded Dec. 2024, pp. 1-10. https://securithings.com/enterprise-solution/.

(Continued)

*Primary Examiner* — Trang U Tran
(74) *Attorney, Agent, or Firm* — Pillsbury Winthrop Shaw Pittman LLP

(57) ABSTRACT

Camera monitoring including determining whether a camera has a direct network connection; in response to determining that it does, querying the camera for a status; in response to determining that the network status of the camera is online: querying for an image captured by the camera; and in response to receiving the image, determining an online/image status for the camera; and in response to receiving the image: identifying a set of rated images captured by the camera; comparing the image received to the set of rated images to determine whether the image received is similar to one or more rated images; and in response to determining that the image received is similar to a rated image of the set of rated images, determining a quality rating of the image received that corresponds the quality rating of the rated image, if not, generating a quality rating for the image.

19 Claims, 7 Drawing Sheets

(56) References Cited

U.S. PATENT DOCUMENTS

| | | | |
|---|---|---|---|
| 2011/0058036 A1* | 3/2011 | Metzger | H04N 7/181 |
| | | | 348/143 |
| 2024/0388459 A1* | 11/2024 | Park | H04L 65/80 |

OTHER PUBLICATIONS

SecuriThings, Essential Visibility—Effortless insight into all your connected devices, downloaded Dec. 2024, pp. 1-9. https://securithings.com/essential-visibility/.

SecuriThings, Operational Management—Gain the power to control and remediate fast, downloaded Dec. 2024, pp. 1-9. https://securithings.com/operational-management.

SecuriThings, Cyber Protection—Cyber secure the devices that secure your organization, downloaded Dec. 2024, pp. 1-9. https://securithings.com/cyber-protection.

SecuriThings, Managed Service Platform—IoTOps for Physical Security, downloaded Dec. 2024, pp. 1-8. https://securithings.com/managed-service-platform/.

CheckMyCCTV, Remote CCTV Maintenance Reinvented, downloaded Dec. 2024, pp. 1-5. https://checkmysystems.com.

Nanodems | PSIM Security—The Converged Vision™ Company, downloaded Dec. 2024, pp. 1-3. https://www.nanodems.com/security/.

Isarsoft, "What is a Video Management System (VMS)?", Knowledge Hub Article, published Jun. 1, 2024 (downloaded Dec. 2024), pp. 1-6. https://www.isarsoft.com/knowledge-hub/vms.

Viakoo, Enterprise IoT Security Platform—IoT Cybersecurity, downloaded Dec. 2024, pp. 1-11. https://www.viakoo.com.

* cited by examiner

CAMERA MONITORING SYSTEMS AND METHODS

RELATED APPLICATIONS

This application is a continuation of U.S. patent application Ser. No. 18/980,331, filed Dec. 13, 2024, and titled "CAMERA MONITORING SYSTEMS AND METHODS", which claims benefit to U.S. Provisional Application No. 63/682,150, filed Aug. 12, 2024, and titled CAMERA MONITORING SYSTEMS AND METHODS, the entireties of which are hereby incorporated by reference.

FIELD

Embodiments relate generally to camera systems and more particularly to monitoring camera system operations.

BACKGROUND

Cameras, including devices designed to capture and record images or videos, have evolved significantly in functionality and application. For example, a high-definition IP camera with night vision can be used to monitor a parking lot, capturing clear footage both day and night, that can be used to monitor activity in the parking lot. Distributed camera systems, which typically include multiple cameras strategically placed across various locations and connected to a central monitoring system, are useful for comprehensive surveillance and security monitoring. These systems are typically useful in large and complex environments such as large public areas or regions, industrial sites, retail stores, and the like. For example, distributed camera systems can be employed in city-wide traffic management, industrial facility operations monitoring, and retail store crime prevention.

SUMMARY

In many instances, a distributed camera system includes one or more remote cameras, a centralized monitoring platform, and a network infrastructure that facilitates communication between the remote camera and the monitoring platform. In such an arrangement, the remote cameras typically capture images, transmit corresponding image data to the monitoring platform, and the monitoring platform may store and process the image data, including embedded images. For example, a set of remote cameras positioned about a parking lot may each capture images of a respective field of view (FOV) that includes a given area of the parking lot, transmit the images to a monitoring server by way of a communications network, such as a Wi-Fi network, and the monitoring server may assess the images for anomalies, such as criminal or other prohibited activity, generate alerts or other reports indicative of detected anomalies, and store the images and reports for future access.

In many instances, having reliable and quality image feeds is a crucial component of distributed camera systems. For example, in the case of surveilling a parking lot for criminal or other prohibited activity, it can be crucial that the camera is online to provide continuous monitoring of the parking lot, has a field of view (FOV) that is capturing images of a desired portion of the parking lot (e.g., the FOV is not tilted or pointed away from the parking lot), and is providing quality images (e.g., the images are relatively clear). For small camera systems, such as those including only a few cameras distributed in a relatively small area, monitoring and maintaining camera system reliability and quality may be relatively easy. In contrast, monitoring and maintaining a relatively complex camera systems, such as those including many cameras distributed over a large area, can be relatively difficult. For example, in the case of a relatively simple camera system having three cameras in a local parking lot, monitoring and maintaining camera system reliability and quality may include personnel regularly inspecting the cameras and their image feeds throughout the day. In contrast, for a relatively complex camera system having tens, hundreds, or thousands of cameras distributed across parking lots across a campus, a city, a state, a country, or the world, monitoring and maintaining camera system reliability and quality can be burdensome or infeasible. For example, it may be impractical or impossible for personnel to regularly inspect and maintain the cameras and their image feeds.

Provided are improved techniques for monitoring camera system operations. In some embodiments, monitoring the operational status (or "health") of cameras includes assessing whether monitored cameras are online/offline and whether images provided by cameras are of sufficient quality. Monitoring and assessing a camera's health may include assessing operations of a camera for which it is desirable to answer the general question of is it "working" (e.g., "is it live on the network and producing an image"). The processes described here may provide an answer to this question, along with diagnostic information that can aid a user in identifying the extent and source of an issue and how best to resolve it. For example, a camera status (or "liveness") assessment may be conducted to determine whether a camera is online/offline (e.g., if the camera is responding to queries and is capable of providing images). Further, if a camera is online and providing images, a camera image verification (or "quality assessment") may be conducted to assess quality of images provided by the camera (e.g., to determine whether the camera's images capture the appropriate FOV, are sufficiently clear, or the like). In some embodiments, a corresponding camera health report is generated to convey results of liveness and quality assessments. Further, suggested actions or other feedback can be generated based on a health report, and associated corrective actions (e.g., changing camera settings, resetting a camera, adjusting a camera's position, clearing a camera's field of view, or the like) can be implemented to improve a camera's liveness or image quality.

In some embodiments, determining whether a monitored camera's status, such as online (or "live" or "operational") or offline (or "dead" or "non-operational"), includes assessing an ability to communicate with the camera. For example, the network status of a camera may be determined based on attempts to contact the camera directly (e.g., across a communication network) or indirectly via an intermediary device (e.g., a network access device (NAD)). In some embodiments, acquiring an image captured by a camera includes attempts to obtain the image via multiple communication protocols. For example, an image query may include a series of attempts to obtain an image from a camera via different communications protocol, such as HyperText Transfer Protocol (HTTP), Real Time Streaming Protocol (RTSP), or the like. In some embodiments, if an image is not obtained, an attempt is made to contact the camera via a unique network address for the camera, such as an IP (Internet Protocol) address, to determine whether the camera is indeed responsive on the network, despite not providing images. In such embodiments, the results may be used to determine a status of the camera, such as online (or "live"), offline (or "down" or "dead"), image available (or "image"), image error (e.g., software error), or a combination thereof (e.g., live/image, live/software-error, live/missing image).

In some embodiments, determining a monitored camera's image quality includes generating an image quality rating that is indicative of one or more characteristics of an image captured using the camera. For example, an image captured using a camera may be compared to other previously rated images (e.g., the image captured using the camera may be compared to other images previously captured by the camera and that have already been rated by a user) and in response to identifying a previously rated image that is similar to the image captured using the camera, the same or similar rating may be assigned to the image captured using the camera. In some embodiments, where it is determined that no previously rated image is similar to the image captured, an image quality assessment of the image captured may be conducted to determine an image quality rating for the image. The image quality rating may, for example, reflect a variety of image characteristics. For example, determining an image quality rating for an image may include a blur assessment that generates a "blur" score, a tilt/fov assessment that generates a "tilt/fov" score, a block assessment that generates a "block" score, a glare assessment that generates a "glare" score, a fault assessment that generates a "fault" score, a low light assessment that generates a "low light" score, or the like. In some embodiments, a quality rating may include indications of individual characteristics or a combination thereof. For example, an image quality rating may include a listing of the separate scores for each of the above, or a "fusion" scoring that is a composite scoring based on one or more individual scorings (e.g., a maximum, minimum, total or average of the individual scorings, or the like). Also, although certain embodiments are described in the context of numerical scoring, a rating may include other suitable forms, such as textual descriptor (e.g., blur=yes/no, tilt/fov=tilt right, or the like).

Although certain embodiments are described in a given context for the purpose of illustration, embodiments may be employed in any suitable context. For example, although certain embodiments are described regarding monitoring parking lots, embodiments may be employed for monitoring residences, commercial buildings, retail stores, industrial facilities, transportation infrastructure, parks, or the like.

Figure 1:
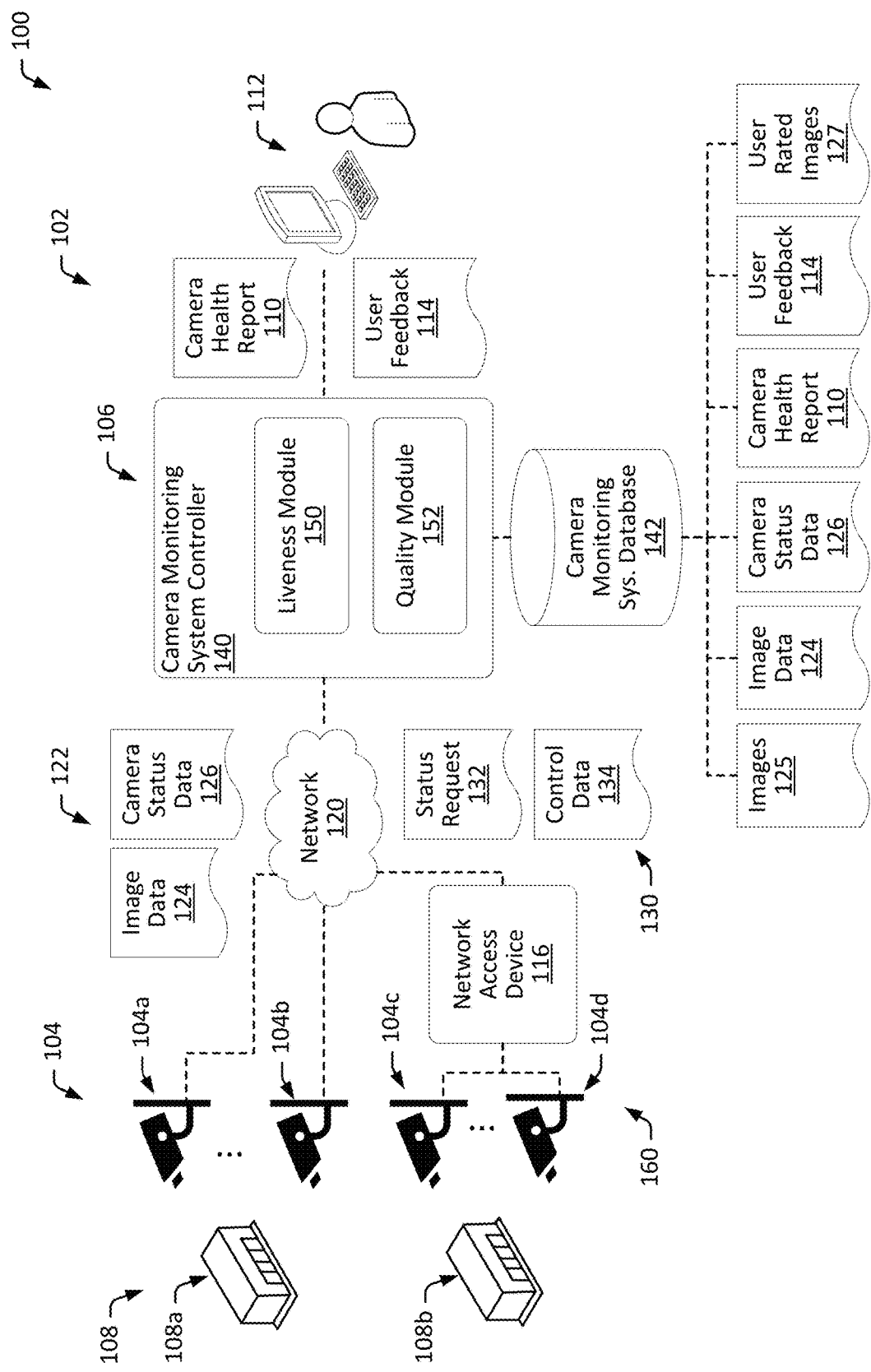
FIG. 1 is diagram that illustrates a monitoring environment in accordance with one or more embodiments.

While this disclosure is susceptible to various modifications and alternative forms, specific example embodiments are shown and described. The drawings may not be to scale. The drawings and the detailed description are not intended to limit the disclosure to the form disclosed, but are intended to disclose modifications, equivalents, and alternatives falling within the spirit and scope of the present disclosure as defined by the claims.

DETAILED DESCRIPTION

Described are embodiments for monitoring camera system operations. In some embodiments, monitoring the operational status (or "health") of cameras includes assessing whether monitored cameras are online/offline and whether images provided by cameras are of sufficient quality. Monitoring and assessing a camera's health may include assessing operations of a camera for which it is desirable to answer the general question of is it "working" (e.g., "is it live on the network and producing an image"). The processes described here may provide an answer to this question, along with diagnostic information that can aid a user in identifying the extent and source of an issue and how best to resolve it. For example, a camera status (or "liveness") assessment may be conducted to determine whether a camera is online/offline (e.g., if the camera is responding to queries and is capable of providing images). Further, if a camera is online and providing images, a camera image verification (or "quality assessment") may be conducted to assess quality of images provided by the camera (e.g., to determine whether the camera's images capture the appropriate FOV, are sufficiently clear, or the like). In some embodiments, a corresponding camera health report is generated to convey results of liveness and quality assessments. Further, suggested actions or other feedback can be generated based on a health report, and associated corrective actions (e.g., changing camera settings, resetting a camera, adjusting a camera's position, clearing a camera's field of view, or the like) can be implemented to improve a camera's liveness or image quality.

In some embodiments, determining whether a monitored camera's status, such as online (or "live" or "operational") or offline (or "dead" or "non-operational"), includes assessing an ability to communicate with the camera. For example, the network status of a camera may be determined based on attempts to contact the camera directly (e.g., across a communication network) or indirectly via an intermediary device (e.g., a network access device (NAD)). In some embodiments, acquiring an image captured by a camera includes attempts to obtain the image via multiple communication protocols. For example, an image query may include a series of attempts to obtain an image from a camera via different communications protocol, such as HyperText Transfer Protocol (HTTP), Real Time Streaming Protocol (RTSP), or the like. In some embodiments, if an image is not obtained, an attempt is made to contact the camera via a unique network address for the camera, such as an IP (Internet Protocol) address, to determine whether the camera is indeed responsive on the network, despite not providing images. In such embodiments, the results may be used to determine a status of the camera, such as online (or "live"), offline (or "down" or "dead"), image available (or "image"), image error (e.g., software error), or a combination thereof (e.g., live/image, live/software-error, live/missing image).

In some embodiments, determining a monitored camera's image quality includes generating an image quality rating that is indicative of one or more characteristics of an image captured using the image. For example, an image captured using a camera may be compared to other previously rated images (e.g., the image captured using the camera may be compared to other images previously captured by the camera and that have already been rated by a user) and in response to identifying a previously rated image that is similar to the image captured using the camera, the same or similar rating may be assigned to the image captured using the camera. In some embodiments, where it is determined that no previously rated image is similar to the image captured, an image quality assessment of the image captured may be conducted to determine an image quality rating for the image. The image quality rating may, for example, reflect a variety of image characteristics. For example, determining an image quality rating for an image may include a blur assessment that generates a "blur" score, a tilt/fov assessment that generates a "tilt/fov" score, a block assessment that generates a "block" score, a glare assessment that generates a "glare" score, a fault assessment that generates a "fault" score, a low light assessment that generates a "low light" score, or the like. In some embodiments, a quality rating may include indications of individual characteristics or a combination thereof. For example, an image quality rating may include a listing of the separate scores for each of the above, or a "fusion" scoring that is a composite scoring based on one or more individual scorings (e.g., a maximum, minimum, total or average of the individual scorings, or the like). Also, although certain embodiments are described in the context of numerical scoring, a rating may include other suitable forms, such as textual descriptor (e.g., blur=yes/no, tilt/fov=tilt right, or the like).

Although certain embodiments are described in a given context for the purpose of illustration, embodiments may be employed in any suitable context. For example, although certain embodiments are described regarding monitoring parking lots, embodiments may be employed for monitoring residences, commercial buildings, retail stores, industrial facilities, transportation infrastructure, parks, or the like.

FIG. 1 is a diagram that illustrates a monitoring environment ("environment") 100 in accordance with one or more embodiments. In the illustrated embodiment, environment 100 includes a camera system 102, including cameras 104 (e.g., cameras 104a-104d) and a camera health monitoring system (or "camera monitoring system" or "monitoring system") 106. Cameras 104 may, for example, be operable to capture images of associated monitored locations 108 (e.g., monitored locations 108a and 108b), such as parking lots, buildings, stores, facilities, infrastructure, parks, or the like. Monitoring system 106 may, for example, be operable to provide relevant camera health reports 110 to one or more users 112, such as a camera system operator, or to receive or implement user feedback 114, such as user ratings of images or requests for corrective actions to improve performance of camera system 102. In the illustrated embodiment, camera system 102 includes a network access device ("NAD") 116. A NAD 116 may be an intermediary between associated cameras 104 (e.g., cameras 104c and 104d) and monitoring system 106, such as a local video management system (VMS) or similar camera subsystem control devices, such as routers, switches, wireless access points (WAPs), power supplies, power plugs, or the like. In some embodiments, components of camera system 102 are communicatively coupled to monitoring system 106 by way of a communications network ("network") 120. For example, as described, camera 104a or camera 104b may communicate camera data 122, such as camera image data 124 or camera status data 126, to monitoring system 106 by way of network 120. Similarly, network access device 116 may, for example, communicate camera data 122 for one or more associated cameras 104, such as camera image data 124 or camera status data 126 for camera 104c or camera 104d, to monitoring system 106 by way of network 120. Monitoring system 106 may, for example, communicate monitoring data 130, such as status request 132 or control data 134, to camera 104a, camera 104b, or network access device 116 (e.g., for delivery to, or implementation on, camera 104c or camera 104d).

In some embodiments, monitoring system 106 includes a camera monitoring system controller ("controller") 140 and a camera monitoring system database ("database") 142. As illustrated, camera monitoring system controller 140 may, for example, include a status assessment module ("liveness assessment module" or "liveness module") 150 and an image quality assessment module ("quality module") 152. As described, liveness module 150 may, for example, be operable to assess camera data 122 or the like to determine a camera liveness status indicative of an operational status of a camera 104. Such a status may include an indication of a network status and an image acquisition status for a camera 104. For example, a camera liveness status may include a network status of online (or "live") or offline (or "down" or "dead") and an image status of image available (or "image"), or image error (e.g., software error), or a combination thereof (e.g., live/image, live/software-error, live/missing image). Quality module 152 may, for example, be operable to assess camera data 122 or the like to verify images obtained by a camera. This may include determining an image quality rating that is indicative of a quality of one or more images generated by a camera 104. The quality rating may, for example, indicate whether an image is correct and clear (e.g., capturing a correct FOV, experiencing blur, blocking, lighting issues, glare issues, or the like). In some embodiments, monitoring system 106 includes a computer system, which may be the same or similar to computer system 1000 described with regard to at least FIG. 6.

In some embodiments, database 142 is a storage system that provides for managing, storing, retrieving, and manipulating electronic data. In some embodiments, database 142 provides for storage and management of various types of data to ensure the effective operation of monitoring system 106. For example, the database 142 may store camera data 122 (e.g., including image data 124, images 125, and camera status data 126). As described, image data 124 may, for example, include video or still images 125 captured by cameras 104, while camera status data 126 may, for example, include information about the operational state of cameras 104, such as its current recording status, current settings, uptime, and any errors or alerts, or the like. As another example, database 142 may store camera health reports 110. As described, camera health reports 110 may include information about the health and performance of one, some or all camera 104 of system 102. Such a report may include, for example, metrics such as temperature, connectivity status, power levels, and diagnostic information (e.g., including summary statistics, summary statistics indicative of a potential future failure status) that can help in identifying potential issues that can affect a corresponding surveillance operation. As another example, database 142 may store user feedback 114. As described, user feedback 114 may, for example, be provided by one or more users 112, such as security personnel, camera system administrators, or the like that interact with system 102. User feedback 114 may, for example, include ratings of images, reports on the effectiveness of the system, suggestions for improvements, incident reports, and any other relevant information that can help enhance the overall functionality and reliability of system 102. For example, where user 112 provides user feedback 114 that includes ratings of images 125 (e.g., a rating of "healthy", "blur", "tilt/fov", "block", "glare", "fault", or "low light" for a "latest" image 312, as provided in GUI 300b of FIG. 3B), images 125 may be stored in association with the corresponding user provided ratings to generate a set of rated images 127.

In some embodiments, network 120 communicatively couples one or more entities of environment 100. For example, network 120 may operate to communicatively couple devices of monitoring system 106 with other networked devices, such as cameras 104, network access devices 116, users 112, or the like. Network 120 may include, for example, one or more electronic communication networks, such as the Internet, a wired or wireless personal area network (e.g., a wireless Bluetooth network), a wired or wireless local area network (e.g., a wired Ethernet network or Wi-Fi based network), a wired or wireless wide area network (e.g., a wired Ethernet network or wireless cellular based network), or the like that facilitates communication between the various devices/entities communicatively coupled thereto. As described, data (e.g., camera data 122 or monitor data 130) may be transmitted between monitoring system 106 and a camera 104 or a network access device 116 via network 120. In some embodiments, cameras 104 (e.g., camera 104c and 104d) are coupled to a NAD (e.g., NAD 116) by way of a communication network, which may be network 120 or a similar communication network (e.g., a local area network). Network 120 may employ various devices such as routers, switches, wireless access points (WAPs), power supplies, plugs, or the like. For example, a camera 104 may be connected to a network switch (e.g., a switch of a NAD 116 that is powered by way of a smart plug and a power supply) that is coupled to a WAP of network 120 that is coupled to a router of network 120 that is coupled to controller 140 via other network devices, such as backend routers and switches of network 120.

In some embodiments, cameras 104 include imaging devices that are operable to capture images and transmit corresponding image data. For example, camera 104a may include an analog or digital camera having an analog or digital image sensor operable to capture an image (e.g., a two-dimensional (2D) photograph) 125 and camera 104a may be operable to output image data 124 that includes 125 or otherwise corresponds to the captured image 125. In the case of camera 104a being directed toward location 108a such that its FOV includes a portion of a parking lot in front of a building, camera 104a may capture an image 125 that corresponding to the FOV, including a 2D image of the portion of a parking lot. In such an embodiment, camera 104a may, for example, transmit corresponding image data 124, including an image file corresponding to the 2D photograph, to monitoring system 106 by way of network 120. In the case of camera 104a capturing and transferring a video (e.g., including a series of captured 2D dimensional images), camera 104a may, for example, transmit corresponding image data 124, including a video file that composed of multiple 2D photograph image files corresponding to the video, to monitoring system 106 by way of network 120. In some embodiments, cameras 104 have an onboard processing system (e.g., circuitry or a computer processor) that is operable to generate and transmit image data 124. For example, camera 104a may include an onboard processor that is operable to convert analog or digital signals received from the image sensor into corresponding image data 124 and effectuate communication of camera data 122 that includes the generated image data 124, to monitoring system 106. Similarly, cameras 104 may be operable to communicate other information to monitoring system 106. For example, the processor of camera 104a may communicate camera data 122 that includes camera status data 126, to monitoring system 106. In some embodiments, camera status data 126 for a camera 104 includes data indicative of an operational state of the camera 104 or associated devices, such as network switches, power supplies, access points, routers, or the like. For example, camera status data 126 for camera 104a may include information such as "live", "down", "image error", "active/inactive/deactivated", "motion detection active/inactive/deactivated", "listening", "connected to network", "network switch live/down", "network switch port live/down", "power supply live/down," "power plug live/down", or the like). In the case of monitoring system 106 querying a camera 104, camera status data 126 may include a response to the query that indicates the camera 104 is operational. In some embodiments, cameras 104 operate responsive to or in accordance with communications by an external entity, such as monitoring system 106. For example, camera 104a may be operable to receive monitor data 130, such as control data 134 or a status request 132, from monitoring system 106 and operate in accordance with the monitor data 130. For example, where monitor data 130 sent by monitoring system 106 to camera 104a includes control data 134 that includes commands to acquire an image at a given time, change settings of the camera, reset or power cycle the camera, or take some other action, the processor of camera 104a may receive and process the control data 134 and effectuate a corresponding response, such as acquiring an image at the given time, changing to the specified camera settings, resetting or power cycling camera 104a, or taking a requested action. As another example, where monitor data 130 sent by monitoring system 106 to camera 104a includes a status request 132 that includes a command to provide an indication of operational status, the processor of camera 104a may receive and process the status request 132 and effectuate a corresponding response, such as transmitting camera data 122 that includes camera status data 126 indicating the operation status of camera 104a, such as its state and current camera settings (e.g., "live: connected to network: no imaging error: motion detection active: resolution: 1080p/1920x1080: gain=5 . . . "). In some embodiments, cameras 104 have unique network identifiers, such as unique IP (Internet Protocol) addresses, that enable specific identification of and communication with individual cameras 104. For example, camera system 106 may direct monitor data 130 to the IP address associated with camera 104a. In some embodiments, some or all of cameras 104 connected via a NAD 116 may have a unique network identifier for at least the local network of the associated camera subsystem 160. For example, cameras 104b and 104c may each have a unique IP address within camera sub-system 160, camera system 106 may direct monitor data 130 to the IP address associated NAD 116 along with an indication that camera 104c is the destination, and NAD 116 may forward (e.g., port forward) the monitor data 130 to camera 104c. In some embodiments, a camera 104 includes a computer system, which may be the same or similar to computer system 1000 described with regard to at least FIG. 6.

In some embodiments, a network access device ("NAD") 116 includes one or more devices that facilitate network connectivity with cameras 104. For example, a NAD 116 may include a communication management system or other network devices, such as network switches, power supplies, access points, routers, or the like, that facilitate connectivity between cameras 104 and other components of network 120, such as controller 140. In some embodiments, a NAD 116 serves as a central hub for processing, consolidating, and managing data transferred to or from cameras 104 connected thereto (e.g., cameras 104c and 104d). In such an embodiment, NAD 116 and its connected camera 104 may define a corresponding camera sub-system 160. NAD 116 may be, for example, a Video Management System (VMS), a Network Video Recorder (NVR), or a Digital Video Recorder (DVR). Similar to communications described between cameras 104 and monitoring system 106 (e.g., direct communication between cameras 104a and 104b with monitoring system 106), cameras 104 connected to a NAD 116 may communicate and exchange similar data (e.g., camera data 122 and monitor data 130) with NAD 116. For example, as connected cameras 104c and 104d capture images 125, they may transmit corresponding image data 124 to NAD 116. In the case of NAD 116 being an NVR or DVR, NAD 116 may receive image data 124, whether in digital or analog form, and record it onto a storage media (e.g., a local memory device) for retrieval and analysis. A NAD 116, such as an NVR or VMS, may provide network access but also a relatively uniform software access to gather information from cameras 104. For example, although there may be hundreds of camera manufacturers and thousands of versions with corresponding interface requirements, there may be far fewer NVR/VMS and far fewer versions for a system 106 to integrate with. Thus, a NAD 116 may provide a single point of access to any number of cameras 104 connected to (or "behind") the NAD 116. In some embodiments, NAD 116 incorporates image processing capabilities to handle high-definition video streams, compress and store data, and enable real-time viewing and playback. In the case of NAD 116 being VMS, it may provide a software-based solution for managing camera sub-system 160. For example, a VMS may integrate with computer servers, or other capable systems, such as NVRs or DVRs, offering centralized control and a unified interface for monitoring, recording, and analyzing video feeds from cameras 104. In some embodiments, NAD 116 controls operations of the associated camera sub-system 160. For example, NAD 116 may manage camera configurations, set recording schedules, and support motion detection or other analytics to enhance security. In some embodiments, NAD 116 communicates with external entities, such as monitoring systems or remote servers. For example, NAD 116 may communicate to monitoring system 106, camera data 122 that includes image data 124 (e.g., that includes or corresponds to captured images 125) and camera status data 126, for one or both of connected cameras 104c and 104d. Likewise, NAD 116 may receive monitor data 130, including control data 134 or status requests 132, for NAD 116 or cameras 104c and 104d connected thereto, and NAD 116 may process and effectuate corresponding actions, such as controlling operations and settings of cameras 104c and 104d in accordance with the control data 134. In some instances, this may include collecting status information for cameras 104c and 104d and providing responsive camera data 122, including camera status data 126, to monitoring system 106 in accordance with a status query 132. In some embodiments, a NAD 116 includes a computer system, which may be the same or similar to computer system 1000 described with regard to at least FIG. 6.

In some embodiments, a NAD 116 includes or otherwise employs various types of devices. For example, NAD 116 of FIG. 1 may include a chain of connection that includes a network switch, a power supply, and a smart plug, with cameras 104c and 104d connected to the network switch and the network switch connected to broader network 120. The network switch may, for example, serve as a hub for connecting multiple devices, facilitating communication and data transfer, and may supply power to connected devices, such as cameras (e.g., by way of PoE). Such a switch may, for example, route data packets between cameras 104c and 104d and the broader network 120, ensuring efficient transmission of video streams or other data. The power supply may, for example, provide electrical power to the network switch, cameras, or other devices connected to NAD 116. It may, for example, convert power from an external source, such as the smart plug, into a usable format for the devices, such as the network switch and cameras 104c and 104d. The smart plug may, for example, operate as an intelligent power source that connects the power supply to an external power outlet. It may, for example, include remote control capabilities, such as turning power on or off via a smartphone app and an associated network connection, and may provide energy monitoring and fault detection. For example, the smart plug may monitor electrical flow to devices of the NAD 116, such as the network switch and cameras 104c and 104d, and report a corresponding status (e.g., "plug on," "plug off," "plug delivering power"/"device consuming power," or the like) offering a layer of control and visibility into the power supply chain. For example, if a camera, the network switch, or the power supply becomes inoperative, the smart plug status may be remotely checked to determine whether the issue lies at the power supply or the plug and, if not, confirming the operation of the plug and power supply may narrow the problem to the network switch or the camera. Such a configuration may provide comprehensive connection chain monitoring, improving troubleshooting and operational efficiency. As an example, a camera (e.g., camera 104c) may be connected to the network switch for internet connectivity (and potentially power). The network switch may, in turn, be powered by a power supply, which is plugged into the smart plug connected to an external power outlet (e.g., a wall plug). If a system error is detected, such as the camera not reporting an image or otherwise being unresponsive or the network switch failing to transmit data or otherwise being unresponsive, a power supply chain assessment may be conducted to identify a source of the failure. For example, the smart plug may be queried for operational status, such as whether power is being supplied to and consumed by the attached device (e.g., the power supply). If the smart plug indicates that power is being supplied to and consumed by the attached device, it may be determined that the smart plug is operational and so is the power supply, and, in turn, that the failure is a network failure (e.g., a failure at the network switch or the camera). In such an embodiment, a corresponding alert may be provided (e.g., "network failure-power supply operational") and, in turn, personnel may direct their repair efforts to the camera, the network switch, or other network devices without focusing efforts on the power supply, the smart plug, or other power supply chain devices. If the smart plug indicates that power is being supplied to, but is not being consumed by, the attached device, it may be determined that the smart plug is operational and the power supply is not operational and, in turn, that the failure is a power failure (e.g., the power supply is not operational). In such an embodiment, a corresponding alert may be provided (e.g., "power failure—power supply not operational") and, in turn, personnel may direct their repair efforts to the power supply (e.g., reset/replace the power supply), without focusing efforts on the camera, the network switch, or other network devices, or on the smart plug, or other power supply chain devices. If the smart plug indicates that power is not being supplied to the attached device, it may be determined that the smart plug is not operational and, in turn, that the failure is a power failure (e.g., the smart plug is not operational). In such an embodiment, a corresponding alert may be provided (e.g., "power failure-smart plug not operational") and, in turn, personnel may direct their repair efforts to the smart plug (e.g., reset/re-plug/replace the smart plug), and not focus efforts on the camera, the network switch, or other network devices, or on the power supply, or other power supply chain devices. Such a targeted diagnosis and alert system may help to inform users of what devices do and do not need attention, thereby aiding in rapid resolution of connectivity and power issues, saving time and effort, and reducing downtime. This may help ensure robust operation and enhance user confidence by providing clear, actionable insights into the status of interconnected devices.

In some embodiments, monitored locations 108 include a physical location that is monitored by one or more cameras 104 of monitoring system 102. For example, location 108a may be a retail store visually monitored by cameras 104, including cameras 104a and 104b positioned such that their fields of view capture respective portions of a parking lot of the store. Location 108b may be an office building visually monitored by cameras 104, including cameras 104c and 104c positioned such that their fields of view capture respective portions of an exterior of the building. Although certain embodiments are described with regard to monitoring parking lots and the exterior of a building for the purpose of illustration, embodiments may be employed for any suitable context, such as monitoring residences, industrial facilities, transportation infrastructure, parks, or the like.

In some embodiments, user 112 is a person or other entity that interacts with monitoring system 106. For example, user 112 may be security personnel that are tasked with reviewing and monitoring surveillance footage captured by camera 104 or maintenance personnel or systems tasked with maintaining operations of cameras 104. As described, user 112 may employ a computer terminal for receiving and presenting images captured by cameras 104, receiving and presenting camera health reports 110 (e.g., reports indicating operational status of cameras 104), or providing user feedback 114 (e.g., comments or commands for manipulating one or more of cameras 104 to improve the operations of monitoring system 106. In some embodiments, user 112 may employ or otherwise include a computer system, which may be the same or similar to computer system 1000 described with regard to at least FIG. 6.

In some embodiments, camera health report 110 includes information concerning the operational status of camera system 102. This may include, for example, status information concerning whether cameras 104 are operational (e.g., whether one or more of cameras 104 are offline or online and capable of providing images), image verification (or "quality") information concerning the quality of images provided by cameras 104 (e.g., whether images 125 captured by one or more of cameras 104 are clear/blurry, the FOV is tilted or otherwise mis-aligned, the FOV is blocked, or the like), or other information that is relevant to the operational status of cameras 104 (e.g., network device status information that is indicative of the operational state of network devices that facilitate operation of the cameras 104, such as the operational state of communication management systems, such as NADs, or other network devices, such as network switches, power supplies, plugs, access points, routers, or the like, that facilitate operation of cameras 104). This may further include, for example, status information concerning whether cameras 104 are recording video evidence or monitoring whether those recordings are retained for a user-specified number of days, or verifying the hardware that stores recordings (e.g., hard-drives) to ensure their operation and ability to continue reading and writing recording files, or verifying that the timestamp associated with recording files has not drifted from the time in the time zone where the camera system 102 is physically located. Regarding image retention, for example, a set of images for a given camera and their respective timestamps may be inspected to determine whether images from the camera include one or more images that are at least a threshold age (e.g., 1 month old or older) to confirm that images acquired by the camera are being retained for at least a threshold duration (e.g., 1 month). If, for example, a set of images for a camera does not include images timestamped with times older than the threshold age, it may be determined that there is a possible error regarding the camera's retention policy, and the camera retention settings (or related system retention settings) may be updated to correct the error. Regarding verification of timestamps, for example, a timestamp for an image requested (or otherwise known to be obtained) at a given time may be compared to the given time to ensure that it is within an acceptable tolerance. If, for example, the timestamp of an image is more than a threshold amount different than the expected time (e.g., more than 10 minutes less than or greater than the given time), it may be determined that the camera's timestamp is incorrect (e.g., has "drifted"), it may be determined that there is a possible camera clock issue, and the camera's clock may be inspected and updated to reflect the correct time. Such software may ensure that security camera system 102 owners have a reliable method to obtain the video evidence they expect to have from the security camera system 102 after a security incident and that it can be used as evidence during adjudication. As described, a camera health report 110 may be provided to user 112 for inspection. In some instances, corrective action may be taken based on a camera health report 110 or associated user feedback 114.

In some embodiments, user feedback 114 includes ratings (e.g., comments or scoring), suggestions, commands, or the like provided by user 112. For example, in response to user 114 reviewing a report indicating that camera 104a is online but not acquiring images, user 112 may provide, to monitoring system 106, user feedback 114 that includes a suggestion or request to reset camera 104a. In some embodiments, action is taken in response to user feedback 114. Continuing with the above example, in response to monitoring system 106 receiving user feedback 114 that includes a request to reset camera 104a, monitoring system 106 may issue a reset command to camera 104a, and camera 104a may, in turn, initiate a self-reset routine. In some embodiments, user 112 or another entity may initiate appropriate action independent of camera monitoring system 106. For example, in response to user 114 reviewing a report indicating that camera 104a is blocked by an object and has a tilted FOV, user 114, or other personnel, may visit location 108a, remove the blockage, and adjust the position of camera 104a to eliminate the tilt. Accordingly, camera monitoring system 102 and the techniques described may provide an efficient and effective system for monitoring, assessing, and maintaining a distributed camera system.

Figure 2:
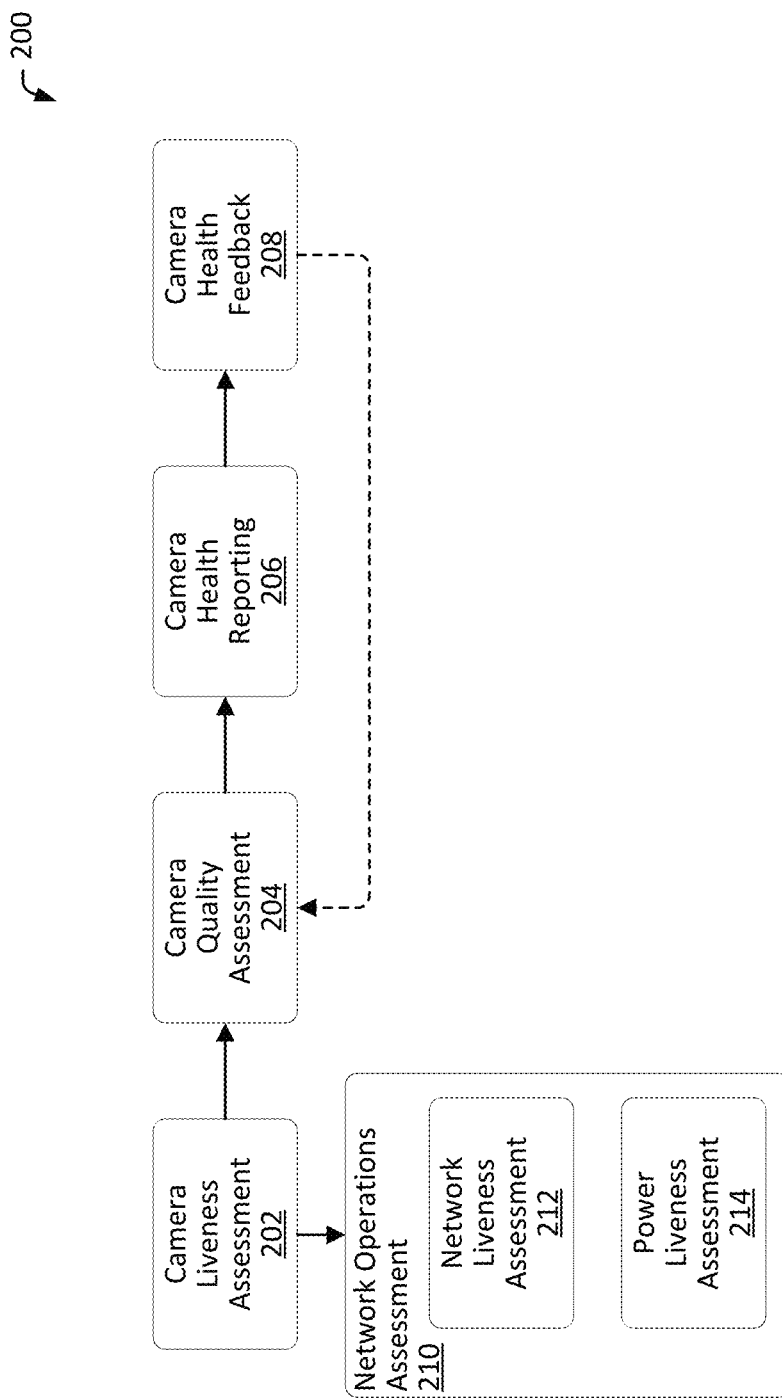
FIG. 2 is a flow diagram that illustrates a method of camera system monitoring in accordance with one or more embodiments.

FIG. 2 is a flow diagram that illustrates a method 200 of camera system monitoring in accordance with one or more embodiments. Some or all of the procedural elements of method 200 may be performed, for example, by one or more entities described here, such as controller 140, user 114, or the like.

In some embodiments, method 200 includes a camera status (or "liveness") assessment (block 202). This may include determining whether a camera is online/offline or otherwise operational (e.g., if the camera is responding to queries and is capable of providing images). For example, conducting a liveness assessment may include controller 140 (e.g., liveness module 150) querying for the status of each of some or all of cameras 104 of camera system 102. In the case of cameras 104 with a direct connection to controller 140 (e.g., camera 104a or 104b), this may include controller 140 directly querying the camera 104 for its status. For example, controller 140 may direct a status request 132 to each of cameras 104a and 104b, and each of cameras 104a and 104b may (or may not) respond controller 140 with corresponding status data 126. In the case of cameras 104 with an indirect connection to controller 140 (e.g., cameras 104c or 104d indirectly connected by way of NAD 116), this may include controller 140 indirectly querying for camera 104 status. For example, controller 140 may direct, to NAD 116, a status request 132 that request the status of each of cameras 104c and 104d, and NAD 116 may, in turn, determine a status for each of cameras 104c and 104d and respond to controller 140 with corresponding status data 126. In some embodiments, if a camera's status is unsatisfactory (e.g., the camera 104 is not responsive or is otherwise determined to be offline), an alert may be issued. For example, where camera 104a fails to respond to a status request 132 from controller 140, controller 140 may issue a camera health report 110 with an indication that camera 104a is offline (or "down") or otherwise unresponsive. In some embodiments, where NAD 116 is not responsive to a status request 132, it may be determined that NAD 116 (or its associated camera subsystem 160, including cameras 104c and 104d) is offline (or "down") or otherwise unresponsive.

In some embodiments, method 200 includes a camera image verification (or "quality") assessment (block 204). This may include determining whether a camera is providing quality images (e.g., if the camera's images capture the appropriate FOV and are sufficiently clear). For example, conducting a quality assessment may include controller 140 (e.g., quality module 152), for each camera 104 providing image data 124 (e.g., for each of cameras 104a-104d), assessing corresponding images provided to determine whether the FOV is correct (e.g., the camera 104 is not tilted or otherwise skewed or pointed in the wrong direction) and that the image of sufficient image quality (e.g., the image is not blurred, over exposed, or the like). In some embodiments, if a camera's image quality is unsatisfactory (e.g., the FOV is not correct or the images are blurry, overexposed or the like), an alert may be issued. For example, where images provided by camera 104b are determined to be tilted and blurry, controller 140 may issue a camera health report 110 with an alert indicating that the images provided by camera 104b are tilted and blurry.

In some embodiments, method 200 includes camera operational status (or "health") reporting (block 206). This may include generating reports or other indications of the operational status (or "health") of one or more elements of camera system 102, including cameras 104. For example, controller 140 may generate, responsive to conducting a camera liveness assessment and a camera quality assessment, a camera health report 110 that includes information indicative of the liveness and image quality of each of some or all of cameras 104 of system 102. Continuing with the above examples, where camera 104a fails to respond to a status request 132 from controller 140, images provided by camera 104b are determined to be tilted and blurry, and it is determined that cameras 104c and 104d are online and providing quality images, controller 140 may issue a camera health report 110 that includes an indication that camera 104a is not responsive, that images provided by camera 104b are tilted and blurry, and that cameras 104c and 104d are online and providing quality images. In some embodiments, a camera health report 110 is presented to user 112 via a graphical user interface (GUI), such as that described herein with regard to at least FIGS. 3A and 3B.

In some embodiments, method 200 includes camera health feedback (or "feedback") (block 208). This may include obtaining feedback concerning the operational status (or "health") of one or more elements of camera system 102, including cameras 104. For example, camera health feedback may include user 114 (e.g., a security person or system administrator) generating user feedback 114 that is received and implemented by controller 140. Continuing with the above examples, where camera health report 110 includes an indication that camera 104a is not responsive, that images provided by camera 104b are tilted and blurry, and that cameras 104c and 104d are online and provided quality images, user feedback 114 may include (1) a request to reset camera 104a, (2) a request to adjust focus settings of camera 104b, (3) a request to alert maintenance personnel to adjust the position of camera 104b, and (4) an indication that images from camera 104c are actually tilted and of low quality. In such an embodiment, controller 140 may perform the following: (1) send, to camera 104a, control data 134 to cause camera 104a to conduct a reset (e.g., a power cycle of camera 104a); (2) send, to camera 104b, control data 134 to cause camera 104b to adjust its focus settings; (3) send, to maintenance personnel, a request to visit location 108a and adjust the position of camera 104b; and (4) record, in association with stored images 125 captured by camera 104c, and indication that the images 125 are tilted and of low quality, which can be implemented for future training assessments of image quality (e.g., the tilted and of low quality indicators can be used as a vector for training of an image quality detection artificial intelligence (AI) model maintained by controller 140 for use in camera quality assessment, as indicated by the dashed line of FIG. 2). Thus, for example, user feedback 114 may generate a closed loop system for training image quality assessment models maintained by quality module 152 and used for determining image quality. In some embodiments, user feedback 114 is obtained from user 112 via an interactive graphical user interface (GUI), such as that described herein with regard to at least FIGS. 3A and 3B.

In some embodiments, method 200 includes a network operations assessment (block 210). This may include, in response to determining that a camera is offline or otherwise not operational (e.g., if the camera is not responding to queries or is not capable of providing images), assessing the operation of other network devices to determine whether the detected "liveness" issue is a result of an issue with the camera or other network devices, such as a NAD, a network switch, a power supply, a smart plug, an access point, a router, or the like. For example, a network operations assessment may include controller 140 (e.g., liveness module 150), in response to determining that camera 104c is not responding to queries or is not capable of providing images, proceeding to assess the operational status of intermediary network devices, such as components of NAD 116 to determine whether the issue resides in the NAD 116 or camera 104c itself. If it is determined that the NAD 116 is experiencing issues, remedial activities may focus on identifying and correcting issues with the NAD 116 (e.g., checking/resetting the NAD 116 or associated devices, such as a network switch, a power supply, a smart plug, an access point, a router, or the like integrated in the NAD 116). In contrast, if it is determined that the NAD 116 is not experiencing issues, remedial activities may focus on identifying and correcting issues with camera 104*c* (e.g., checking/resetting camera 104*c*).

In some embodiments, network operations assessment includes a network liveness assessment (block 212) or a power liveness assessment (block 214). A network liveness assessment may include a query of the operational status of one or more network devices that communicatively couple a camera to a network. For example, where camera 104*c* is determined to be offline or otherwise not operational (e.g., if the camera is not responding to queries or is not capable of providing images) and camera 104*c* is communicatively coupled to network 120 by way of a network switch, network liveness assessment may include controller 140 (e.g., liveness module 150) querying the network switch for its operational status. If, for example, the network switch responds to such a query with an indication that it is online and operational (or "alive"), it may be determined that the issues originate with camera 104*c* itself, and remedial activities may focus on identifying and correcting issues with camera 104*c* (e.g., checking/resetting camera 104*c*).

Figure 3A:
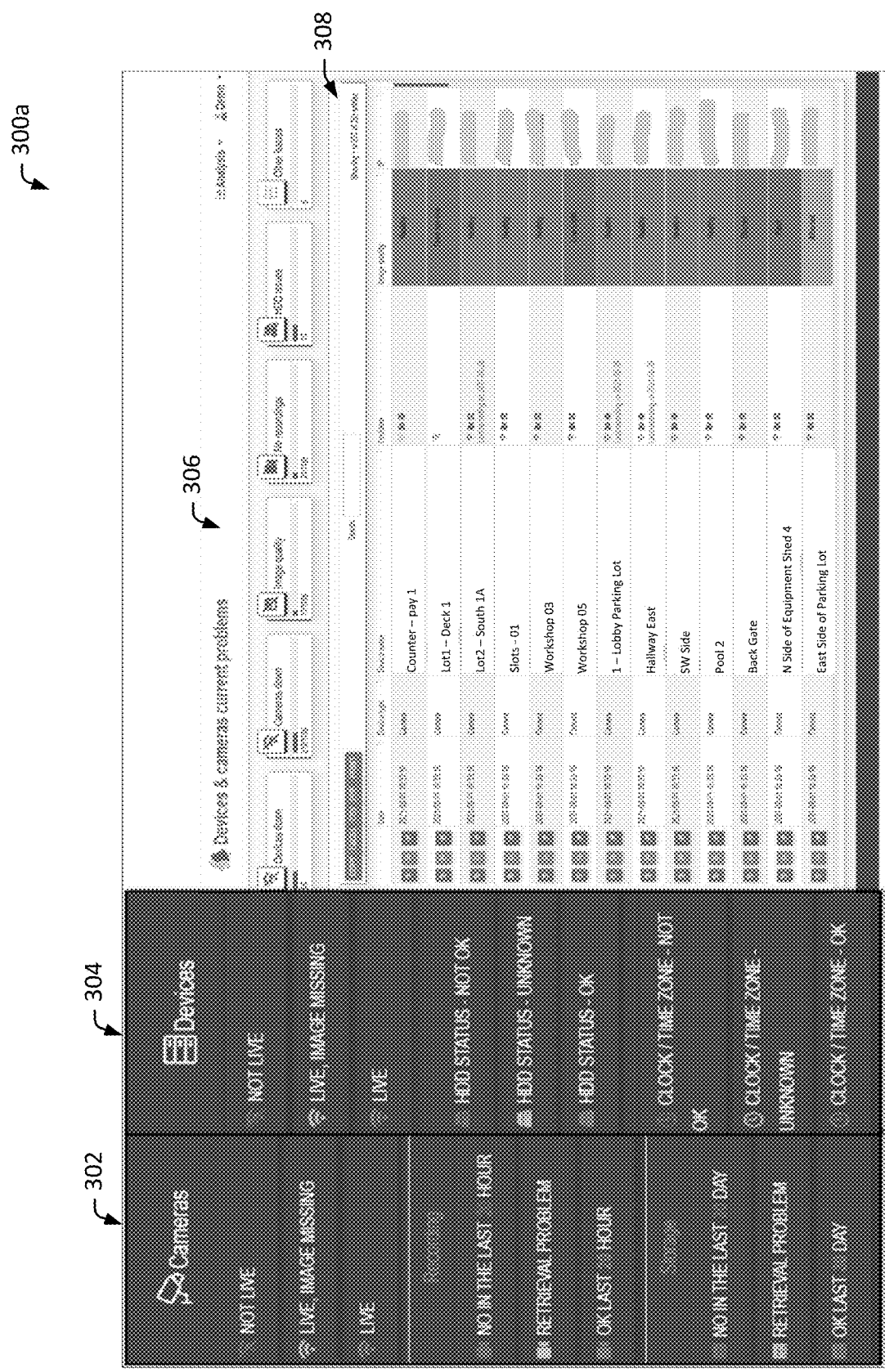
FIGS. 3A and 3B are diagrams that illustrate interactive user interfaces in accordance with one or more embodiments.
Figure 3B:

A power liveness assessment may include a query of the operational status of one or more power sources for network devices that communicatively couple a camera to a network. For example, where camera 104*c* is determined to be offline or otherwise not operational (e.g., if the camera is not responding to queries or is not capable of providing images) and camera 104*c* is communicatively coupled to network 120 by way of a network switch, power liveness assessment may include controller 140 (e.g., liveness module 150) querying one or more devices that supply power to the network switch (e.g., devices in the network switch's chain of power) for their operational status. If, for example, the network switch does not respond to a query for an operational status with an indication that it is online and operational (or "alive") or it responds with an indication of an error with its power source, it may be determined that the issues potentially originate with the network switch or its chain of power supply (and not camera 104*c* itself), and remedial activities may focus on identifying and correcting issues with the network switch or its chain of power supply. In such an embodiment, responsive to the determination that the issues potentially originate with the network switch or its chain of power supply, a power liveness assessment may be conducted that includes controller 140 (e.g., liveness module 150) querying one or more devices that provide power to the network switch (e.g., devices in the network switch's chain of power) for their operational status. Where the network switch is supplied power by way of a power supply that is plugged into a smart plug, this may include querying the power supply for its operational status or querying the smart plug for it operational status. If the power supply responds to such a query with an indication that it is online and operational (or "alive"), it may be determined that the issues originate downstream of the power supply, such as with the network switch or camera 104*c* itself (e.g., based on the logic that the network switch is receiving power), and remedial activities may focus on identifying and correcting issues with the network switch or camera 104*c* (e.g., checking/resetting the network switch or camera 104*c*). If the power supply fails to respond to such a query or provides an indication that it is offline or otherwise not-operational (or "dead"), it may be determined that the issues originate at, or upstream of, the power supply, such as with the power supply or the smart plug (e.g., based on the logic that the power supply is not working and the network switch is not receiving power), and remedial activities may focus on identifying and correcting issues at or upstream of the power supply, such as with the power supply or the smart plug (e.g., checking/resetting the power supply or the smart plug). In such an embodiment, the source of the issue may be further investigated and narrowed by way of a query of the operational status of the smart plug. For example, if the power supply fails to respond to such a query or provides an indication that it is offline or otherwise not-operational (or "dead"), the power liveness assessment may include controller 140 (e.g., liveness module 150) querying the smart plug for its operational status. If the smart plug provides an indication that power is being supplied to, but is not being consumed by, the attached device, it may be determined that the smart plug is operational (or "alive") and the power supply is not operational and, in turn, that the failure is a power failure (e.g., the power supply is not operational). In such an embodiment, a corresponding alert may be provided (e.g., "power failure-power supply not operational") and, in turn, personnel may direct their repair efforts to the power supply (e.g., reset/replace the power supply), and not focus efforts on the camera, the network switch, or other network devices, or on the smart plug, or other power supply chain devices. If the smart plug indicates that power is not being supplied to the attached device, it may be determined that the smart plug is not operational and, in turn, that the failure is a power failure (e.g., the smart plug is not operational). In such an embodiment, a corresponding alert may be provided (e.g., "power failure-smart plug not operational") and, in turn, personnel may direct their repair efforts to the smart plug (e.g., reset/re-plug/replace the smart plug), and not focus efforts on the camera, the network switch, or other network devices, or on the power supply, or other power supply chain devices. Such a layered assessment of the camera, and the network devices and their associated power supplies may provide an iterative investigation that can quickly and specifically diagnose the potential root cause of an issue and, in turn, allow remedial efforts to be focused on the most likely source of the issue (while avoiding unnecessary efforts), which can provide a robust and efficient system. FIGS. 3A and 3B are diagrams that illustrate interactive user interfaces in accordance with one or more embodiments. FIG. 3A illustrates an interactive system level GUI 300*a* that includes a camera status key 302, a device status key 304, a system status summary 306, and a camera status listing 308. Camera status key 302 defines various status items and associated icons for cameras. Device status key 304 defines various status items and associated icons for devices (e.g., NADs). System status summary 306 provides indications of numbers/percentages of camera system devices experiencing an issue, including an indication of number of devices down, number of cameras down, number of cameras having image quality issues, number of cameras not providing recordings, number of hard disk drive (HDD) issues (e.g., HDD type NADs), and other issues. Camera status listing 308 includes, for each of a plurality of individual cameras, a corresponding row/entry providing information for a given date/time, including an indication of the date/time, device type (e.g., camera or NAD), device name (e.g., a unique device name/identifier), problems (e.g., indicated by corresponding icons and associated textual information, image quality (e.g., indication of good ("healthy" in green) or a status or image quality issue (e.g., "feed not live", "low light", "blurred", "fault", "affected", or the like).

In some embodiments, items are interactive in that they are user selectable to provide or navigate to corresponding information. For example, a row/entry corresponding to a device, such as a camera or NAD, may be user selectable to navigate to an interactive camera level GUI corresponding to the device.

FIG. 3B illustrates an interactive device level GUI 300b (e.g., for a camera identified as "Counter—pay 1") that includes a reference image 310, a latest image 312, a device status summary 314, and illustrating an interactive user feedback GUI 316. Reference image 310 may include an image that is considered to be of good quality and is representative of a desired FOV and image for the associated camera. Such a reference image may be acquired at setup of the camera, or periodically to provide the camera system and a user with a base image for comparison to later images, such as latest image 312. Latest image 312 may be the most recent, or at least a relatively recent image, captured using the associated camera. For example, latest image 312 may be the most recent image transmitted from a camera that has been received and processed by a system controller. Display of reference image 310 adjacent latest image 312 may facilitate comparison of the two images by a user viewing the images. Device status summary 314 may provide a listing or other indication of various characteristics and associated values for the associated camera, such as whether it is live, has recent recordings (e.g., in the last several hours or last week), and additional information, such as recent inspection dates/times, camera type, firmware version, frame rate setting, resolution setting, recording type (e.g., still image, video, or the like), or the like. Such a listing may enable a user to quickly assess characteristics and settings of the associated camera. User feedback GUI 316 includes fields and selections for providing user feedback concerning the camera. For example, a text field 318 enables a user to enter and submit text comments regarding the associated camera, and condition selection buttons 320 enable a user to select and submit a condition concerning the associated camera. Thus, for example, if the health report and GUI 300b indicates that the camera is healthy, but the latest image 312 is blurry relating to the reference image 310, the user may enter text of "the image appears to be out of focus" and select the "blur" selection button 320 to provide feedback that the associated camera is producing blurred images. In such an embodiment, corresponding user feedback 114 is transmitted to a system controller (e.g., controller 140), and a status and camera health report for the camera may be updated to reflect the latest blurred image. Also, as described, the user feedback may be used to train a detection algorithm (e.g., an AI model for detecting image quality). In some embodiments, items of device level GUI 300b are interactive in that they are user selectable to provide or navigate to corresponding information. For example, a user may select a device from the hierarchical listing of devices 322 (to left) to navigate to a device level GUI corresponding to the device. Such interactive user interfaces may enable users to easily and quickly make a thorough review of system and device status and make corresponding comments or updates.

Figure 4:
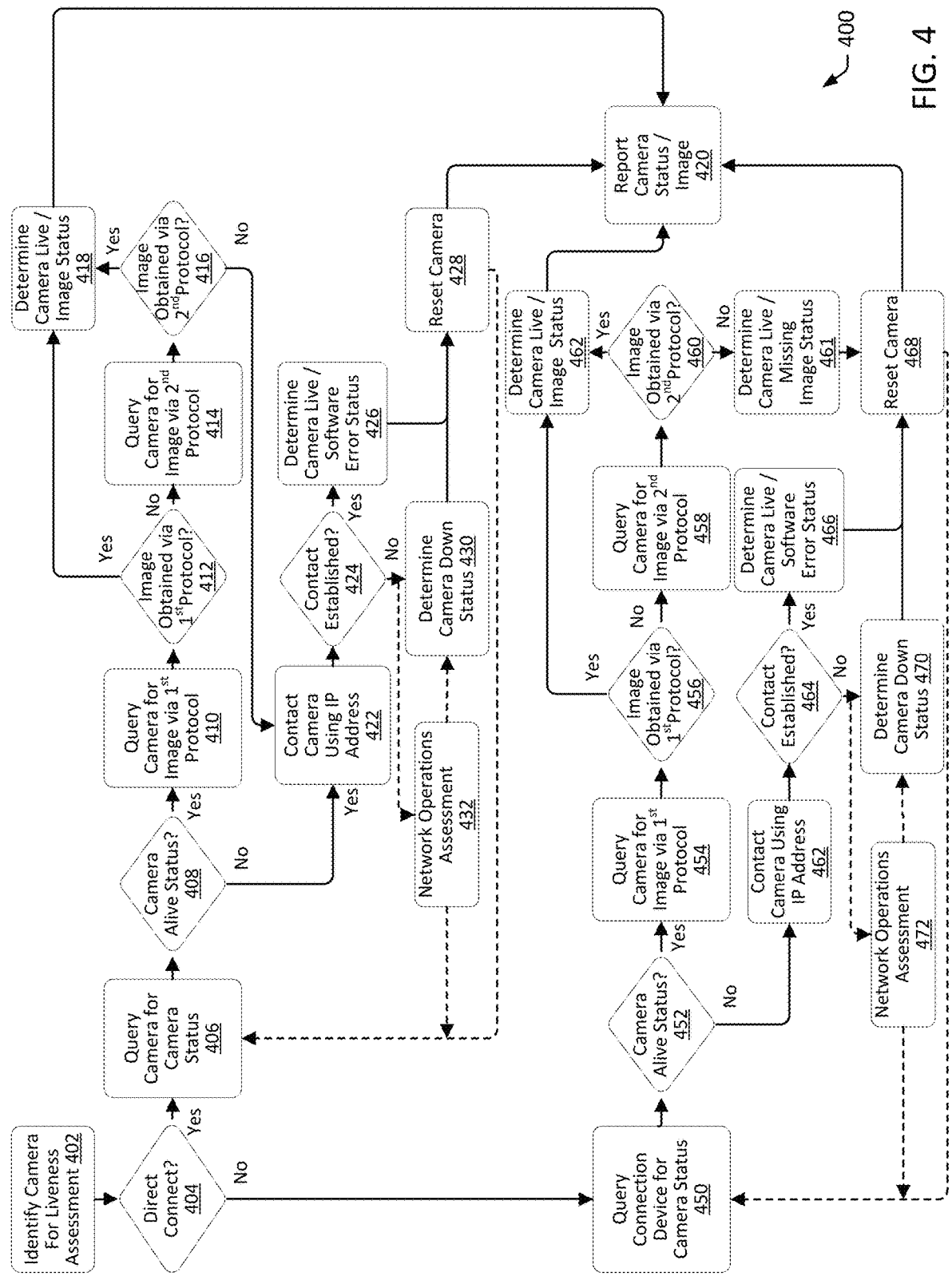
FIG. 4 is a flowchart diagram that illustrates a method of camera status assessment in accordance with one or more embodiments.

FIG. 4 is a flowchart diagram that illustrates a method of camera status (or "liveness") assessment 400 in accordance with one or more embodiments. Some or all of the procedural elements of method 400 may be performed, for example, by one or more entities described here, such as liveness module 150 of controller 140, or the like.

In some embodiments, method 400 includes identifying a camera for liveness assessment (block 402). This may include identifying one or more cameras that are to be inspected for liveness at a given time. The time may, for example, be a preselected inspection time (e.g., Jan. 1, 2024 at 3 pm) or interval (e.g., hourly, daily at 3 pm, weekly on Sunday at 3 μm, or the like). Such a time or interval may be selected to ensure regular operational status check-ins, while minimizing overhead that can reduce system performance (e.g., to avoid querying cameras 104 so often that it generates additional traffic that negatively impacts camera 104 or network operations). For example, identifying a camera for liveness assessment may include liveness module 150 of controller 140 identifying camera 104a for liveness assessment at 3 pm on Jan. 1, 2024, based on a camera inspection schedule that includes daily testing of cameras 104, with camera 104a scheduled for daily assessment at 3 pm.

In some embodiments, method 400 includes determining whether a camera has direct network connection (block 404). This may include determining whether a camera identified for liveness assessment has a direct line of communication with a controller (e.g., via traditional channels of network, such as servers, routers, switches, etc.) or has an indirect line of communication with a controller (e.g., via a NAD or of the like). For example, in the context of cameras 104a-104d, determining whether a camera identified for liveness assessment has a direct network connection may include liveness module 150 determining that cameras 104a and 104b each have a direct network connection with controller 140 (e.g., via network 120), and cameras 104c and 104d each have an indirect network connection (e.g., via NAD 116 of camera sub system 160).

In some embodiments, method 400 includes querying a camera for camera status (block 406). This may include, in response to determining that a camera identified for liveness assessment has a direct line of communication with a controller, the controller querying the identified camera for status information by way of the direct line of communication. Continuing with the above example, querying a camera for camera status may include liveness module 150 causing controller 140 to send a first status request 132 to camera 104a via network 120 (e.g., sending a request addressed to the IP address of camera 104a and including a query for a status of camera 104a), or sending a second status request 132 to camera 104b via network 120 (e.g., sending a request addressed to the IP address of camera 104b and including a query for a status of camera 104b).

In some embodiments, method 400 includes determining whether a camera has an online (or "live") network status (block 408). This may include monitoring for a response to a status request sent to a camera that indicates an online (or "live") or offline network status for the camera. Continuing with the above example, in the case of sending the first status request 132 and camera 104a being online, camera 104a may respond with camera status data 126 indicative of camera 104a being online (or "live"). As a result, liveness module 150 may determine that camera 104a has a "live" network status. In the case of sending the second status request 132 and camera 104a being offline or otherwise unable to respond, camera 104b may not respond with camera status data 126, indicating that camera 104b is offline (or "down" or "dead"), or at least not online (or "alive"). As described, liveness module 150 may determine that camera 104b does not have a "live" network status.

In some embodiments, method 400 includes querying a camera for an image via a first protocol (block 410). This may include, in response to determining that a camera is online (or "live"), querying the camera for an image by way of a first communication protocol, such as HyperText Transfer Protocol (HTTP) or the like. For example, querying a camera for an image via a first protocol may include liveness module 150, in response to determining that camera 104*a* has an online (or "live") network status, causing controller 140 to send a request for camera 104*a* to send an image to controller 140 by way of HTTP.

In some embodiments, method 400 includes determining whether an image is obtained by way of a first protocol (block 412). This may include monitoring for an image provided by way of a first communication protocol in response to a corresponding query for an image by way of the first communication protocol. For example, in the case of liveness module 150 causing controller 140 to send a request for camera 104*a* to send an image to controller 140 by way of HTTP, and camera 104*a* receiving the request and being capable of responding by way of HTTP, camera 104*a* may capture an image 125 and respond by sending camera image data 124, including or otherwise corresponding to the image 125, to controller 140 by way of HTTP communication across network 120. As a result, liveness module 150 may determine that an image is obtained from camera 104*a* via the first protocol. In the case of camera 104*a* not receiving the request or not being capable of responding by way of HTTP, camera 104*a* may not respond or may send camera status data 126 indicating that camera 104*a* is unable to communicate an image via HTTP or otherwise fulfill the request. As a result, liveness module 150 may determine that an image is not obtained from camera 104*a* via the first protocol.

In some embodiments, method 400 includes querying a camera for an image via a second protocol (block 414). This may include, in response to determining that a camera has online (or "live") network status and is unable to communicate an image via a first communication protocol, querying the camera for an image by way of a second communication protocol that is different from the first protocol, such as Real Time Streaming Protocol (RTSP) or the like. For example, querying a camera for an image via a second protocol may include liveness module 150, in response to determining that camera 104*a* has a network status of online (or "live") and is unable to communicate an image via HTTP, causing controller 140 to send a request for camera 104*a* to send an image to controller 140 by way of RTSP.

In some embodiments, method 400 includes determining whether an image is obtained by way of a second protocol (block 416). This may include monitoring for an image provided by way of a second communication protocol in response to a corresponding query for an image by way of the second communication protocol. For example, in the case of liveness module 150 causing controller 140 to send a request for camera 104*a* to send an image to controller 140 by way of RTSP, and camera 104*a* receiving the request and being capable of responding by way of RTSP, camera 104*a* may capture and image 125 and respond by sending camera image data 124, including or otherwise corresponding to the image 125, to controller 140 by way of RTSP communication across network 120. As a result, liveness module 150 may determine that an image is obtained from camera 104*a* via the second protocol. In the case of camera 104*a* not receiving the request or not being capable of responding by way of RTSP, camera 104*a* may not respond or may send camera status data 126 indicating that camera 104*a* is unable to communicate an image via RTSP or otherwise fulfill the request. As a result, liveness module 150 may determine that an image is not obtained from camera 104*a* via the second protocol.

In some embodiments, method 400 includes determining that a camera has an online/image (or "live/image") operational status (block 418). This may include determining that a camera has an online (or "live") status and can provide an image in response to a query for an image. For example, liveness module 150 may determine, in response to determining that an image is obtained from camera 104*a* via the first protocol (e.g., at block 412) that camera 104*a* has a live/image operational status. Similarly, liveness module 150 may determine, in response to determining that an image is obtained from camera 104*a* via the second protocol (e.g., at block 416) that camera 104*a* has a live/image operational status.

In some embodiments, method 400 includes reporting a camera operational status/image (block 420). This may include, in response to determining a camera network status or receiving a requested image, reporting the status or the image. For example, reporting a camera status/image may include liveness module 150, in response to determining that camera 104*a* has a live/image status, reporting the live/image status and the corresponding image 125 obtained from camera 104*a* (e.g., the image obtained via the first or second protocol) to quality module 152 and populating a camera health report 110 with the status of "online" (or "live") for camera 104*a* and the image obtained from camera 104*a*.

In some embodiments, method 400 includes attempting to contact a camera using an IP address (block 422). This may include attempting to elicit a response from a camera associated with a known IP address by sending a query to the camera at the IP address. Continuing with the example described at block 416 concerning camera 104*a* not providing an image via second protocol, in response to determining that an image 125 is not obtained via second protocol from camera 104*a* (e.g., at block 416), attempting to contact a camera using an IP address may include liveness module 150 causing controller 140 to send a query for a response to the known IP address for camera 104*a* (e.g., an IP address provided to system 106 at the time of setup and connection to camera 104*a*), and monitoring for a response from camera 104*a*. Similarly, continuing with the example described at block 408 concerning determining that camera 104*b* does not have a "live" network status (e.g., at block 408), attempting to contact a camera using an IP address may include liveness module 150 causing controller 140 to send a query for a response to the known IP address for camera 104*b*, and monitoring for a response from camera 104*b*.

In some embodiments, method 400 includes monitoring for establishment of contact with a camera using an IP address (block 424). This may include monitoring for receipt of a communication from a camera that is responsive to a query for a response sent to the camera using an IP address associated with the camera. Such a communication may indicate that the camera is online but experiencing a software or network error (e.g., software is not running, software is running but not network accessible (e.g., blocked by firewall software), or the like), that prevents sending of an image. Continuing with the prior examples concerning cameras 104*a* and 104*b*, monitoring for establishment of contact with a camera using an IP address may include liveness module 150 monitoring for receipt of a responsive communication from each of cameras 104*a* and 104*b*. In response to receiving a communication from camera 104*a*, for example, it may be determined that contact has been established with camera 104*a* using its IP address. In response to not receiving a communication from camera 104*b*, for example, it may be determined that contact has not been established with camera 104b using its IP address.

In some embodiments, method 400 includes, in response to determining that contact has been established with a camera using its IP address, proceeding to determine a camera online/software-error (or "live/software-error") operational status (block 426). For example, in response to determining that contact has been established with camera 104a using its IP address (e.g., at block 424), liveness module 150 may determine camera 104a has an online/software-error (or "live/software-error") operational status. Given the absence of an image, this may be considered a form of an online/image-error (or "live/image-error") operational status. In some embodiments, this may be followed by resetting the camera (e.g., as described at block 428) and reporting the camera status/image (e.g., as described at block 420). For example, liveness module 150 may effectuate a reset of camera 104a (e.g., in manner that is the same or similar to that described with regard to block 428) and effectuate a reporting of the live/software-error operational status for camera 104a to quality module 152 and populate a camera health report 110 with the operational status of "live/software error" for camera 104a In some embodiments, method 400 includes resetting a camera (block 428). This may include proceeding to take steps to cause a camera to reset. For example, where communication is available between controller 140 and camera 104a via network 120, resetting a camera may include liveness module 150 causing controller 140 to send, to camera 104a via network 120, control data 134 including a command to reset. In such an embodiment, camera 104a may, in response to receiving the command of the control data 134, initiate a self-reset (e.g., a self-initiated reboot or a power-cycle). Where communication is not available between controller 140 and camera 104a via network 120, resetting a camera may include liveness module 150 causing controller 140 to cause a reset of camera 104a. This may include, for example, liveness module 150 causing controller 140 to send, to a smart power controller that powers camera 104a, a command to power-cycle camera 104a. In such an embodiment, the smart power controller may power-cycle camera 104a (e.g., it may disconnect power from camera 104a for a given duration and reconnect power to camera 104a) in response to receiving the command. In some embodiments, this is followed by reporting the camera status/image (e.g., as described at block 420). For example, liveness module 150 may effectuate a reset of camera 104a (e.g., in manner that is the same or similar to that described with regard to block 428) and report the live/software-error operational status for camera 104a to quality module 152 and populate a camera health report 110 with the status of "live/software error" for camera 104a. In some embodiments, a reset of camera 104d may include liveness module 150 causing controller 140 to send, to camera 104a, control data 134 that includes a command to reset camera 104d.

In some embodiments, method 400 includes determining a camera has an offline (or "down") operational status (block 430). This may include determining that the camera cannot be contacted by way of an IP address. For example, liveness module 150 may determine, in response to determining that camera 104b cannot be contacted by way of an IP address (e.g., contact cannot be established with camera 104b using a known IP address for camera 104b (e.g., as described for block 424)) that camera 104a has an offline (or "down") status. In some embodiments, this may be followed by resetting the camera (e.g., as described at block 428) and reporting the camera status/image (e.g., as described at block 420). For example, liveness module 150 may effectuate a reset of camera 104b (e.g., in manner that is the same or similar to that described with regard to block 428) and report the offline (or "down") operational status for camera 104b to quality module 152 and populate a camera health report 110 with the operational status of "down" for camera 104b.

In some embodiments, method 400 includes conducting a network operations assessment (block 432). This may include assessing the operational status of one or more devices that facilitate operation of the camera, such as network switches, power supplies, plugs, access points, routers, or the like, that facilitate operation of the camera in question. This may include, for example, assessing one or more network communications devices, such as a network switch, of a chain of networking that communicatively couples the camera to the broader network 120 (e.g., by way of a network liveness assessment that is the same or similar to that described with regard to block 212), or assessing one or more power sources for the camera or network devices that communicatively couple the camera, such as a power supply or a smart plug, of a chain of power that powers the devices that communicatively couple the camera to the broader network 120 (e.g., by way of a power liveness assessment that is the same or similar to that described with regard to block 214). Such an assessment may include iterative checks of the operational status of the various devices to specifically identify the potential root cause of the issue, such as a given device (e.g., the network switch, a power supply for the network switch, or a smart plug for the power supply), or a given segment of a chain of networking or power, such as upstream or downstream of a given device. For example, where camera 104a is communicatively coupled directly to network 120 and is powered by a power supply and a smart plug that provides power to the power supply, and it is determined that contact is not established with camera 104a (e.g., at block 424), prior to making a determination that camera 104a is itself down, method 400 may move to a network operations assessment (block 432) to determine whether another device that facilitates operation of camera 104a is the source of the issue. This may include a power liveness assessment that includes controller 140 (e.g., liveness module 150) querying one or more devices that provide power to camera 104a (e.g., devices in camera 104a chain of power) for its operational status. Where camera 104a is supplied power by way of the power supply that is plugged into the smart plug, this may include querying the power supply for its operational status or querying the smart plug for its operational status. If the power supply responds to such a query with an indication that it is online and operational (or "alive"), it may be determined that the issues originate downstream of the power supply, such as with camera 104a itself (e.g., based on the logic that camera 104a is receiving power). As a result, it may be determined camera 104a is down (e.g., block 430) and remedial activities may focus on identifying and correcting issues with camera 104a (e.g., checking/resetting camera 104a (e.g., block 428).

If the power supply fails to respond to such a query or provides an indication that it is offline or otherwise not operational (or "dead"), it may be determined that the issues originate at, or upstream of, the power supply, such as with the power supply or the smart plug (e.g., based on the logic that the power supply is not supplying power to camera 104a). As a result, it may be determined the power supply or the smart plug is down and remedial activities may focus on identifying and correcting issues at or upstream of the power supply, such as with the power supply or the smart plug (e.g., checking/resetting the power supply or the smart plug). In such an embodiment, the source of the issue may be further investigated and narrowed by way of a query of the operational status of the smart plug. For example, if the power supply fails to respond to such a query or provides an indication that it is offline or otherwise not operational (or "dead"), the power liveness assessment may include controller 140 (e.g., liveness module 150) querying the smart plug for its operational status. If the smart plug provides an indication that power is being supplied to, but is not being consumed by, the attached device, it may be determined that the smart plug is operational (or "alive") and the power supply is not operational and, in turn, that the failure is a power failure (e.g., the power supply is not operational). In such an embodiment, a corresponding alert may be provided (e.g., "power failure-power supply not operational") and, in turn, without focusing efforts on camera 104a, other network devices, or on the smart plug, or other power supply chain devices. If the smart plug indicates that power is not being supplied to the attached device, it may be determined that the smart plug is not operational and, in turn, that the failure is a power failure (e.g., the smart plug is not operational). In such an embodiment, a corresponding alert may be provided (e.g., "power failure-smart plug not operational") and, in turn, personnel may direct their repair efforts to the smart plug (e.g., reset/re-plug/replace the smart plug), without focusing efforts on the camera, other network devices, or on the power supply, or other power supply chain devices. In response, actions may be taken to remediate the potential issues with the power supply chain devices, and method 400 may return to re-checking the status of the camera. For example, personnel may physically visit and reset (e.g., power cycle) the device suspected of failure (e.g., the power supply or the smart plug), or the device suspected of failure (e.g., the power supply or the smart plug) may be remotely reset (e.g., by way of a command from controller 140 (e.g., liveness module 150) or another entity), and method 400 may return to re-checking the status of camera 104a (e.g., at block 406).

In some embodiments, method 400 includes querying a connection device for a camera status (block 450). This may include, in response to determining a camera identified for liveness assessment has an indirect line of communication with a controller (e.g., network connection by way of a network connection device such as a VMS, NVR, DVR, or the like), querying the network connection device for the status of one or more cameras connected thereto. Continuing with the above example including a determination that cameras 104c and 104d each have an indirect network connection via NAD 116 of camera sub system 160 (e.g., as described with regard to block 404), querying a connection device for a camera status may include liveness module 150 causing controller 140 to send, to NAD 116 via network 120, a status request 132 that includes a query for the network status of one, some or all of camera 104 connected thereto (e.g., one, some or all of cameras 104c and 104d). In such an embodiment, NAD 116 may respond with an indication of the operational status of each of the relevant cameras 104 of the status request 132. For example, where camera 104c is online (or "live") and camera 104d is offline (or "down" or "dead"), NAD 116 may respond with camera status data 126 that indicates that camera 104c is online (or "live") and camera 104d is offline (or "down" or "dead"). Notably, in some embodiments, a NAD may itself be down and, as a result, some or all of the cameras connected to the NAD (or "behind" the NAD) may be unreachable and considered offline (or "down" or "dead") due the inability of the NAD to respond on their behalf.

In some embodiments, method 400 includes determining whether a camera has an online (or "live") status (block 452). This may include monitoring for a response to a status request sent to a network connection device for an indication of the network status of one or more cameras. Continuing with the above example that includes NAD 116 responding with camera status data 126 that indicates camera 104c is online (or "live") and camera 104d is offline (or "down" or "dead"), determining whether a camera has an online (or "live") status may include liveness module 150 determining that camera 104c has an "live" status and camera 104d has an offline (or "down" or "dead") network status or does not otherwise have an "live" network status.

In some embodiments, method 400 includes querying a camera for an image via a first protocol (block 454). This may include, in response to determining that an indirectly connected camera is online (or "live"), requesting that a network connection device query the camera for an image by way of a first communication protocol, such as Hyper-Text Transfer Protocol (HTTP) or the like. For example, querying a camera for an image via a first protocol may include liveness module 150, in response to determining that camera 104a is online (or "live"), causing controller 140 to send to NAD 116, a request to obtain an image from camera 104c by way of HTTP. In response, NAD 116 may query camera 104c for an image by way of HTTP and, if an image 125 is received, forward the image 125 to controller 140. In some embodiments, querying a camera for an image via a first protocol includes liveness module 150 querying the camera for an image by way of the first communication protocol (e.g., as described at block 410).

In some embodiments, method 400 includes determining whether an image is obtained by way of a first protocol (block 456). This may include monitoring for an image obtained by a network connection device by way of a first communication protocol in response to a corresponding query for an image by way of the first communication protocol. For example, in the case of liveness module 150 causing controller 140 to send, to NAD 116, a request to obtain an image from camera 104c by way of HTTP, NAD 116 may query camera 104c to provide an image by way of HTTP, NAD 116 may receive the requested image 125 from camera 104c by way of HTTP, and NAD 116 may send, to controller 140, camera image data 124, including or otherwise corresponding to the image 125, along with an indication that camera 104c and NAD 116 are capable of responding by way of HTTP communication across network 120. As a result, liveness module 150 may determine that an image is obtained via the first protocol. In the case of NAD 116 or camera 104c not receiving the request or not being capable of responding by way of HTTP, camera 104c, or NAD 116, may not respond or may send camera status data 126 indicating that camera 104c, or NAD 116, is unable to communicate an image via HTTP or otherwise fulfill the request. As a result, liveness module 150 may determine that an image is not obtained via the first protocol. In some embodiments, determining whether an image is obtained by way of a first protocol includes liveness module 150 making the determination based on a query of the camera by liveness module 150 (e.g., as described at block 412).

In some embodiments, method 400 includes querying a camera for an image via a second protocol (block 458). This may include, in response to determining that a camera is online (or "live") and is unable to communicate an image via a first communication protocol, requesting that a network connection device query the camera for an image by way of a second communication protocol that is different from the first protocol, such as Real Time Streaming Protocol (RTSP) or the like. For example, querying a camera for an image via a second protocol may include liveness module 150, in response to determining that camera 104*a* is online (or "live") and is unable to communicate an image via HTTP, causing controller 140 to send to NAD 116, a request to obtain an image from camera 104*c* by way of RTSP. In response, NAD 116 may query camera 104*c* for an image by way of RTSP and, if an image 125 is received, send, to controller 140, camera image data 124, including or otherwise corresponding to the image 125. In some embodiments, querying a camera for an image via a second protocol includes liveness module 150 querying the camera for an image by way of the second communication protocol (e.g., as described at block 414).

In some embodiments, method 400 includes determining whether an image is obtained by way of a second protocol (block 460). This may include monitoring for an image obtained by a network connection device by way of a second communication protocol in response to a corresponding query for an image by way of the second communication protocol. For example, in the case of liveness module 150 causing controller 140 to send, to NAD 116, a request to obtain an image from camera 104*c* by way of RTSP, NAD 116 may query camera 104*c* to provide an image by way of RTSP, NAD 116 may receive the requested image 125 from camera 104*c* by way of RTSP, and NAD 116 may send, to controller 140, camera image data 124, including or otherwise corresponding to the image 125, along with an indication that camera 104*c* and NAD 116 are capable of responding by way of RTSP communication across network 120. As a result, liveness module 150 may determine that an image is obtained via the second protocol. In the case of NAD 116 or camera 104*c* not receiving the request or not being capable of responding by way of RTSP, camera 104*c*, or NAD 116, may not respond or may send camera status data 126 indicating that camera 104*c*, or NAD 116, is unable to communicate an image via RTSP or otherwise fulfill the request. As a result, liveness module 150 may determine that an image is not obtained via the second protocol. In some embodiments, determining whether an image is obtained by way of a second protocol includes liveness module 150 making the determination based on a query of the camera by liveness module 150 (e.g., as described at block 416).

In some embodiments, method 400 includes determining a camera has an online/image (or "live/image") operational status (block 462). This may include determining that a camera connected to a NAD has an online (or "live") status and can provided an image in response to a query for an image. For example, liveness module 150 may determine, in response to determining that an image is obtained via the first protocol from camera 104*c* (e.g., at block 456) that camera 104*c* has a live/image operational status. Similarly, liveness module 150 may determine, in response to determining that an image is obtained via the second protocol from camera 104*c* (e.g., at block 416) that camera 104*c* has a live/image operational status. In some embodiments, this is followed by reporting a camera operational status/image (e.g., as described at block 420). For example, reporting a camera status/image may include liveness module 150, in response to determining that camera 104*c* has a live/image status, reporting the live/image status and the corresponding image 125 obtained from camera 104*c* (e.g., the image obtained via the first or second protocol) to quality module 152 and populating a camera health report 110 with the status of "online" (or "live") for camera 104*c* and the image obtained from camera 104*a*.

In some embodiments, method 400 includes reporting the camera status/image (e.g., as described at block 420). For example, liveness module 150 may, in response to determining that camera 104*c* has a live/image operational status, report the live/image operational status and the image 125 obtained from camera 104*c* (e.g., the image obtained via the first or second protocol) to quality module 152 and populate a camera health report 110 with the network status of "online" (or "live") for camera 104*c* and the image obtained from camera 104*c*.

In some embodiments, method 400 includes determining a camera has an online/missing-image (or "live/missing-image") operational status (block 461). This may include determining that a camera connected to a NAD has an online (or "live") status and has not provided an image in response to a query for an image. For example, liveness module 150 may determine, in response to determining that an image is not obtained via the second protocol from camera 104*c* (e.g., at block 460) that camera 104*c* has a live/missing-image operational status. Given the absence of an image, this may be considered a form of an online/image-error (or "live/image-error") operational status. In some embodiments, this is followed by resetting the camera (block 468) and reporting the camera status/image (e.g., as described at block 420). For example, liveness module 150 may effectuate a reset of camera 104*c* (e.g., in manner that is the same or similar to that described with regard to block 428) and report the live/missing image status for camera 104*c* to quality module 152 and populate a camera health report 110 with the operational status of "live/missing-image" for camera 104*c*. In some embodiments, a reset of camera 104*c* may include liveness module 150 causing controller 140 to send, to NAD 116, control data 134 that includes a command to reset camera 104*c*. In such an embodiment, NAD 116 may operate to reset camera 104*c* responsive to the request.

In some embodiments, method 400 may include attempting to contact a camera using an IP address (block 462). This may include, in response to determining that a camera connected to a network access device is not "live", attempting to elicit a response from the camera by sending, to a NAD, a request to query to the camera at its IP address. In the "indirect connection" instance, the issue of "is the IP address known" is important because it may not be known (e.g., the NVR/VMS does not report it and the user does not supply it), as opposed to a "direct connection" instance where a user generally provides the IP address of a camera 104 to enable connection of system 106 to a camera 104. In some embodiments, a camera IP address is known by virtue of its connection to a NAD. For example, each of cameras 104*c* and 104*d* may have an IP address assigned and maintained by NAD 116 and NAD 116 may provide a listing of cameras 104 and associated IP addresses to controller 140. Continuing with the above example concerning determining that camera 104*d* does not having an "live" status (e.g., at block 452), attempting to contact a camera using an IP address may include liveness module 150 causing controller 140 to send, to NAD 116, a request to query camera 104*d* using its IP address, and monitoring for a response from NAD 116 that indicates a response from camera 104*d*. In response, NAD 116 may query camera 104*d* using its IP address and provide a corresponding response to controller 140 that indicates whether camera 104*d* responded to the query. In response to receiving a communication from camera 104*d*, for example, it may be determined that contact has been established with camera 104*d* using its IP address. In response to not receiving a communication from camera 104*d*, for example, it may be determined that contact has not been established with camera 104*d* using its IP address.

In some embodiments, method 400 includes monitoring for establishment of contact with a camera using an IP address (block 464). This may include monitoring for receipt of a communication from a camera connected to a network access device that is responsive to a query for a response sent to the camera using an IP address associated with the camera. Continuing with the prior example concerning camera 104*d*, monitoring for establishment of contact with a camera using an IP address may include liveness module 150 monitoring for receipt of a responsive communication from camera 104*d*. Liveness module 150 may determine that contact with camera 104*d* has been established if there is an indication that camera 104*d* responded to the query and may determine that contact with camera 104*d* has not been established if there is an indication that camera 104*d* did not responded to the query.

In some embodiments, method 400 includes, in response to determining that contact has been established with a camera using its IP address, proceeding to determine a camera online/software-error (or "live/software-error") operational status (block 466). For example, in response to determining that contact has been established with camera 104*d* using its IP address (e.g., at block 464), liveness module 150 may determine camera 104*d* has an online/software-error (or "live/software-error") operational status. Given the absence of an image, this may be considered a form of an online/image-error (or "live/image-error") operational status. In some embodiments, this is followed by resetting the camera (block 468) and reporting the camera status/image (e.g., as described at block 420). For example, liveness module 150 may effectuate a reset of camera 104*d* (e.g., in a manner that is the same or similar to that described with regard to block 428) and report the live/software-error operational status for camera 104*d* to quality module 152 and populate a camera health report 110 with the status of "live/software error" for camera 104*d*. In some embodiments, a reset of camera 104*d* may include liveness module 150 causing controller 140 to send, to NAD 116, control data 134 that includes a command to reset camera 104*d*. In such an embodiment, NAD 116 may operate to reset camera 104*d* responsive to the request.

In some embodiments, method 400 includes, in response to determining that contact has not been established with a camera using its IP address, proceeding to determining that the camera has an offline (or "down") operational status (block 470). For example, liveness module 150 may determine, in response to determining that camera 104*d* cannot be contacted by way of an IP address (e.g., contact cannot be established with camera 104*d* using a known IP address for camera 104*d* (e.g., as described for block 464)), that camera 104*d* has an offline (or "down") operational status. In some embodiments, this may be followed by resetting the camera (e.g., as described at block 468) and reporting the camera status/image (e.g., as described at block 420). For example, liveness module 150 may effectuate a reset of camera 104*d* (e.g., in manner that is the same or similar to that described with regard to block 468) and report the offline (or "down") status for camera 104*d* to quality module 152 and populate a camera health report 110 with the status of "down" for camera 104*d*.

In some embodiments, in response to resetting a camera, method 400 may return to querying for a status of the camera after the reset. For example, in response to a reset of a camera with a direct connection (block 428), method 400 may include returning to querying the camera for a camera status (block 406) (e.g., as illustrated by the upper dashed line). As another example, in response to a reset of a camera with an indirect connection (e.g., via a network access device) (block 468), method 400 may include returning to querying the camera for a camera status (block 450) (e.g., as illustrated by the lower dashed line).

In some embodiments, method 400 includes conducting a network operations assessment (block 472). Similar to that described with regard to that describe (e.g., with regard to block 432), this may include assessing the operational status of one or more devices that facilitate operation of the camera, such as network switches, power supplies, plugs, access points, routers, or the like, that facilitate operation of the camera in question. This may include, for example, assessing one or more network communications devices, such as a network switch, of a chain of networking that communicatively couples the camera to the broader network 120 (e.g., by way of a network liveness assessment that is the same or similar to that described with regard to block 212), or assessing one or more power sources for the camera or network devices that communicatively couple the camera, such as a power supply or a smart plug, of a chain of power that powers the devices that communicatively couple the camera to the broader network 120 (e.g., by way of a power liveness assessment that is the same or similar to that described with regard to block 214). Such an assessment may include iteratively checking the operational status of the various devices to specifically identify the potential root cause of the issue, such as a given device (e.g., the network switch, a power supply for the network switch, or a smart plug for the power supply), or a given segment of a chain of networking or power, such as upstream or downstream of a given device. For example, where camera 104*c* is communicatively coupled to network 120 by way of a network switch of NAD 116 having a chain of power that includes a power supply that powers the network switch and a smart plug that provides power to the power supply, and it is determined that contact is not established with camera 104*c* (e.g., at block 464), prior to making a determination that camera 104*c* is itself down, method 400 may move to a network operations assessment (block 472) to determine whether another device that facilitates operation of camera 104*c* is the source of the issue. This may include a network liveness assessment that includes controller 140 (e.g., liveness module 150) querying the network switch for its operational status.

If, for example, the network switch responds to such a query with an indication that it is online and operational (or "alive"), it may be determined that the issues originate with camera 104*c* itself, and method 400 may proceed to determining a camera down status (block 470) for camera 104*c*, which may in turn lead to remedial activities focused on identifying and correcting issues with camera 104*c* (e.g., resetting camera 104*c* (bock 468)).

If, for example, the network switch does not respond to a query for an operational status with an indication that it is online and operational (or "alive") (or it responds with an indication of an error with its power source), it may be determined that the issues potentially originate with the network switch or its chain of power supply (and not camera 104*c* itself), and the network operations assessment may proceed with queries and remedial activities focused on identifying and correcting issues with the network switch or its chain of power supply. In such an embodiment, responsive to the determination that the issues potentially originate with the network switch or its chain of power supply, a power liveness assessment may be conducted that includes controller 140 (e.g., liveness module 150) querying one or more devices that provide power to the network switch (e.g., devices in the network switch's chain of power) for its operational status. Where the network switch is supplied power by way of the power supply that is plugged into the smart plug, this may include querying the power supply for its operational status or querying the smart plug for its operational status. If the power supply responds to such a query with an indication that it is online and operational (or "alive"), it may be determined that the issues originate downstream of the power supply, such as with the network switch or camera 104c itself (e.g., based on the logic that the network switch is receiving power). As a result, it may be determined camera 104c or the network switch is down (e.g., block 470) and remedial activities may focus on identifying and correcting issues with the network switch or camera 104c (e.g., checking/resetting the network switch or camera 104c (e.g., block 468).

If the power supply fails to respond to such a query or provides an indication that it is offline or otherwise not operational (or "dead"), it may be determined that the issues originate at, or upstream of, the power supply, such as with the power supply or the smart plug (e.g., based on the logic that the power supply is not supplying power to the network switch). As a result, it may be determined the power supply or the smart plug is down and remedial activities may focus on identifying and correcting issues at or upstream of the power supply, such as with the power supply or the smart plug (e.g., checking/resetting the power supply or the smart plug). In such an embodiment, the source of the issue may be further investigated and narrowed by way of a query of the operational status of the smart plug. For example, if the power supply fails to respond to such a query or provides an indication that it is offline or otherwise not-operational (or "dead"), the power liveness assessment may include controller 140 (e.g., liveness module 150) querying the smart plug for its operational status. If the smart plug provides an indication that power is being supplied to, but is not being consumed by, the attached device, it may be determined that the smart plug is operational (or "alive") and the power supply is not operational and, in turn, that the failure is a power failure (e.g., the power supply is not operational). In such an embodiment, a corresponding alert may be provided (e.g., "power failure-power supply not operational") and, in turn, personnel may direct their repair efforts to the power supply (e.g., reset/replace the power supply) without focusing efforts on camera 104c, the network switch, or other network devices, or on the smart plug, or other power supply chain devices. If the smart plug indicates that power is not being supplied to the attached device, it may be determined that the smart plug is not operational and, in turn, that the failure is a power failure (e.g., the smart plug is not operational). In such an embodiment, a corresponding alert may be provided (e.g., "power failure-smart plug not operational") and, in turn, personnel may direct their repair efforts to the smart plug (e.g., reset/re-plug/replace the smart plug) without focusing efforts on the camera, the network switch, or other network devices, or on the power supply, or other power supply chain devices. In response, actions may be taken to remediate the potential issues with the power supply chain devices, and method 400 may return to re-checking the status of the camera. For example, personnel may physically visit and reset (e.g., power cycle) the device suspected of failure (e.g., the power supply or the smart plug), or the device suspected of failure (e.g., the power supply or the smart plug) may be remotely reset (e.g., by way of a command from controller 140 (e.g., liveness module 150) or another entity), and method 400 may return to re-checking the status of camera 104c (e.g., at block 450).

Figure 5:
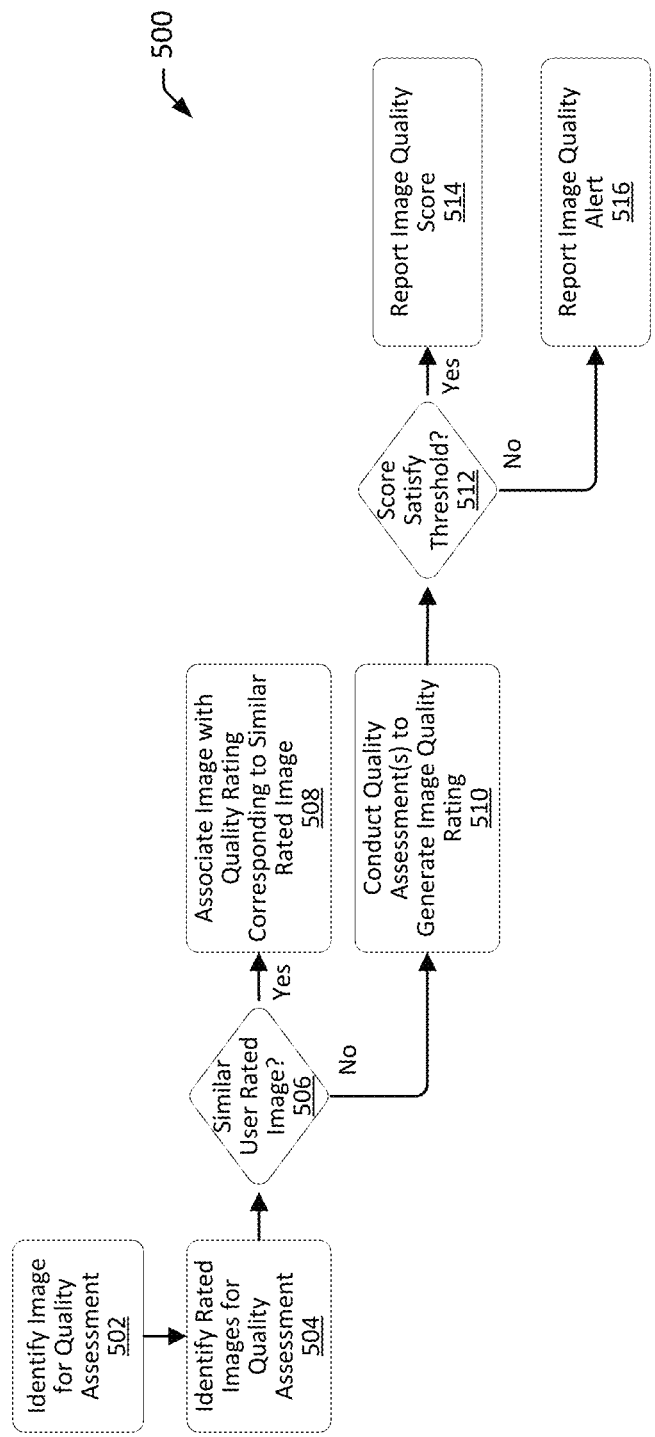
FIG. 5 is a flowchart diagram that illustrates a method of image assessment in accordance with one or more embodiments.

FIG. 5 is a flowchart diagram that illustrates a method of verification (or "quality assessment") 500 in accordance with one or more embodiments. Some or all of the procedural elements of method 500 may be performed, for example, by one or more entities described here, such as quality module 152 of controller 140, user 112, or the like.

In some embodiments, method 500 includes identifying an image for camera image verification (or "quality assessment") (block 502). This may include identifying an image obtained by a camera of a camera system. For example, where liveness module 150 obtains a given image 125 acquired using camera 104a (e.g., as described at block 412 or 416 of FIG. 4) and provides that image to quality module 152 (e.g., as described at block 420 of FIG. 4), identifying an image for quality assessment may include, in response to receiving the given image 125, quality module 152 identifying the given image as an image for quality assessment.

In some embodiments, method 500 includes identifying one or more rated images for verification (or "quality assessment") (block 504). This may include identifying one or more images captured using a given camera and that has a quality rating associated therewith. Continuing with the example concerning quality assessment of an image acquired using camera 104a, identifying one or more rated images for quality assessment may include quality module 152 identifying a subset of rated images 127 that includes one or more of rated images 127 acquired using camera 104a and that has a rating obtained from one or more users 112 via user feedback 114 (e.g., a rating of "healthy", "blur", "tilt/fov", "block", "glare", "fault", or "low light" obtained as described with regard to GUI 300b of FIG. 3B).

In some embodiments, method 500 includes determining whether a similar user rated image is present (block 506). This may include comparing an image identified for quality assessment to one or more rated images to determine levels of similarity between the identified image and the rated images, and determining, based on the levels of similarity, which, if any, of the one or more rated images is similar to the identified image. Continuing with the above example concerning comparing a given image 125 received from camera 104a to a subset of rated images 127 acquired using camera 104a, determining whether a similar user rated image is present may include quality module 152 comparing each image 127 of the subset of rated images 127 to the given image 125 to determine a corresponding similarity score for the rated image 127, and comparing the similarity scores to a similarity threshold score (e.g., a minimum similarity score indicative of the compared images being similar) to determine whether any of rated images 127 of the subset of rated images 127 is similar to the given image. In response to determining that no rated image 127 is similar to the given image (e.g., all related images have a similarity score below the similarity threshold score), it may be determined that no similar user rated image is present. In response to determining that one or more rated images 127 are similar to the given image (e.g., one or more related images have a similarity score at or above the similarity threshold score), it may be determined that one or more similar user rated images is present, and a rated image having the highest similarity score (e.g., indicative of the highest similarity between the given image and the rated images) may be identified as a user rated image that is similar to the given image.

In some embodiments, comparing images to determine similarity includes conducting feature matching or similar technique. For example, feature matching may be employed to compare a rated image 127 (of a set of rated images 127) to a given image and generate a similarity score for the rated image 127. In some embodiments, feature matching of images includes extracting features of the images to be compared, generating feature descriptions for the features extracted, conducting feature matching based on matching of the feature descriptions, and determining a similarity of images based on the matched features. In some instances, feature extraction includes extracting key features from the given image and each image in the set of rated images 127. In some instances, determining a similarity of images based on the matched features includes determining a similarity score for each rated image based on the number and quality of features matched to the given image, where more and better matches between a rated image and the given image generate a higher similarity score for the rated image. In some embodiments, feature matching or scoring employs deep learning to identify matches or generate scoring used for rating images. In such an embodiment, a rated image having the highest similarity score relative to the similarity scores of the other rated images in the set may be identified as a similar user rated image for the given image.

In some embodiments, method 500 includes associating an image with a quality rating corresponding to a similar rated image (block 508). This may include, in response to determining that a given image is similar to one or more user rated images, automatically labeling the given image with a quality rating associated with one or more user rated images determined to be most similar to the given image. For example, where a user rated image 127 acquired using camera 104*a* has a rating of "RATED_IMAGE_A_Rating: healthy=9; blur=3; tilt_fov=9; block=10; glare=4; fault=10; low_light=9" and it is determined that the user rated image 127 is most similar to the given image 125, associating an image with a quality rating corresponding to a similar rated image may include quality module 152 labeling or otherwise associating the given image 125 with the same rating (e.g., "GIVEN_IMAGE_A_Rating: healthy=9; blur=3; tilt_fov=9; block=10; glare=4; fault=10; low_light=9"), and storing the given image 125 (in association with its rating and camera 104*a*) in the set of rated images 127.

In some embodiments, method 500 includes conducting a quality assessment to generate an image quality score (block 510). This may include, in response to determining that a given image is not similar to one or more user rated images, conducting a quality assessment to determine an image quality rating for the given image. For example, where it is determined that a given image obtained using camera 104*a* is not similar to any compared rated images 127 of a set of rated images 127 obtained using camera 104*a*, conducting a quality assessment to generate an image quality score may include quality module 152 conducting a quality assessment to determine a rating for the given image. In some embodiments, determining a rating for an image may include assessing and scoring one or more image characteristics, determining a score for each of the image characteristics, and a composite (or "fusion") score for the image. For example, determining a rating for a given image 125 may include quality module 152 conducting a blur assessment that generates a "blur" score of 4, conducting a tilt/fov assessment that generates a "tilt/fov" score of 9, conducting a block assessment that generates a "block" score of 8, conducting a glare assessment that generates a "glare" score of 8, conducting a fault assessment that generates a "fault" score of 7, conducting a low light assessment that generates a "low light" score of 9, and conducting a fusion scoring that generates a health score of 9. In such an embodiment, the given image 125 may be associated with the following rating "healthy=9; blur=4; tilt_fov-9; block-8; glare=8; fault=7; low_light-9". In some embodiments, the health score may be a scoring based on a combination of one or more of the other scorings. For example, a health score may be an average, unweighted average, maximum, minimum, or the like of the other scorings (e.g., of the blur, tilt/fov, block, glare, fault, and low light). Although embodiments are described regarding an example set of features, embodiments may include assessment and scoring of any type and number of image features, or any suitable technique for generating a composite score.

In some embodiments, method 500 includes determining whether one or more image scores for an image satisfy corresponding threshold criterion (block 512). This may include comparing one or more of characteristic scorings for an image to a corresponding threshold, such as a health score threshold, a minimum score threshold, or the like. For example, where threshold criteria include a minimum health score threshold of 7 and a given image 125 has a health score of 8, determining whether one or more image scores for an image satisfy a corresponding threshold may include quality module 152 determining that the given image 125 satisfies the threshold criteria. Where threshold criteria include a minimum score threshold of 7 for all characteristics and a given image 125 has one or more characteristic scores below 7 (e.g., blur=4), determining whether one or more image scores for an image satisfy a corresponding threshold may include quality module 152 determining that the given image 125 does not satisfy the threshold criteria. Although embodiments are described with regard to an example set of threshold criteria, embodiments may include any suitable threshold criteria.

In some embodiments, method 500 includes reporting an image quality score (block 514). This may include, in response to determining that a given image satisfies corresponding threshold criterion, reporting the image quality scores. Continuing with the above example, where a given image has a given image 125 has a health scoring of "healthy=9; blur=4; tilt_fov=9; block=8; glare-8; fault=7; low_light-9" that satisfies a minimum health score threshold of 7, it may be determined that the image 125 satisfies the corresponding threshold criterion, and the given image 125 may be stored in association with its rating, as a rated image 127, and the image 125 and its rating may be included on a corresponding health report 110.

In some embodiments, method 500 includes reporting an image quality warning (block 516). This may include, in response to determining that a given image does not satisfy corresponding threshold criterion, reporting an image quality warning. Continuing with the above example, where a given image 125 has a health score of "healthy-9; blur=4; tilt_fov-9; block=8; glare=8; fault-7; low_light-9" that does not satisfy a minimum score threshold of 7 (e.g., due to blur having a value below the threshold), it may be determined that the image 125 does not satisfy the corresponding threshold criterion, and an image quality alert (or "warning") may be generated. This may include storing the given image 125 in association with its rating and warning, as a rated image 127, and the image, its rating, and warning indicative of the failure to satisfy the corresponding threshold criterion may be included on a corresponding health report 110.

Figure 6:
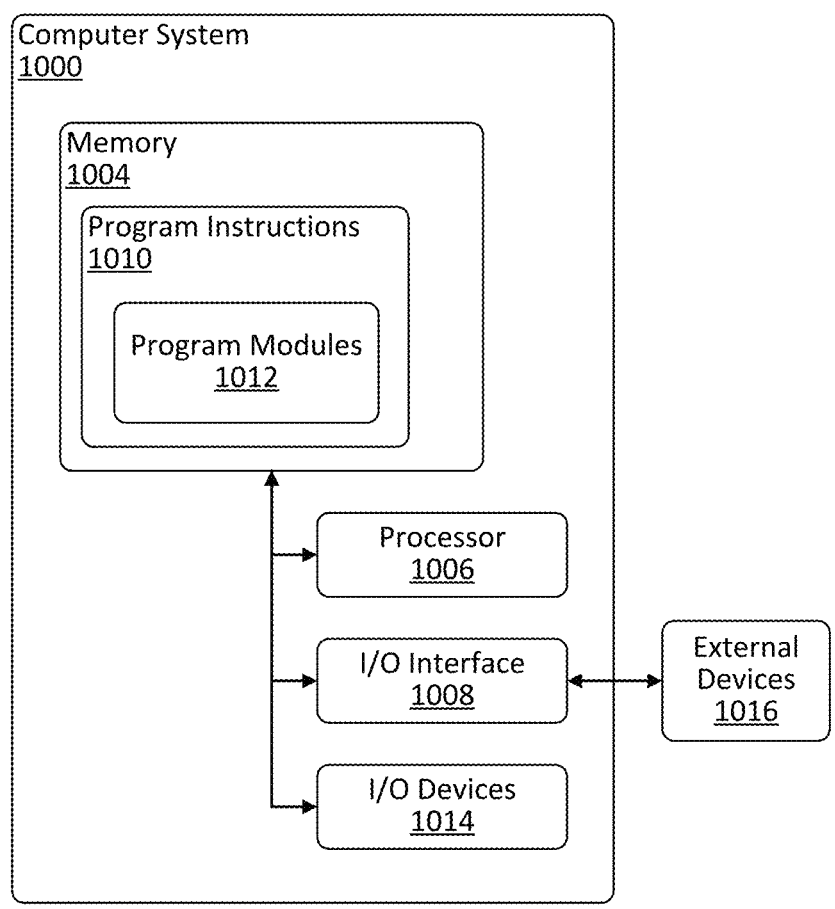
FIG. 6 is a diagram that illustrates an example computer system in accordance with one or more embodiments.

FIG. 6 is a diagram that illustrates an example computer system (or "system") 1000 in accordance with one or more embodiments. The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random-access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored on the medium. The program instructions 1010 may include program modules 1012 that are executable by a computer processor (e.g., the processor 1006) to cause the functional operations described, such as those described with regard to one or more of the entities described (e.g., system 102, cameras 104, controller 140, modules 150 or 152, database 142, user 112, or the like), or one or more of the operations described (e.g., operations of method 200, method 400, or method 500).

The processor 1006 may be any suitable processor capable of executing program instructions. The processor 1006 may include one or more processors that carry out program instructions (e.g., the program instructions of the program modules 1012) to perform the arithmetical, logical, or input/output operations described. The processor 1006 may include multiple processors that can be grouped into one or more processing cores that each include a group of one or more processors that are used for executing the processing described here, such as the independent parallel processing of partitions (or "sectors") by different processing cores to generate a simulation of a reservoir. The I/O interface 1008 may provide an interface for communication with one or more I/O devices 1014, such as a joystick, a computer mouse, a keyboard, or a display/touch screen (e.g., an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016, computer systems, servers or electronic communication networks. In some embodiments, the I/O interface 1008 includes an antenna or a transceiver.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). As used throughout this application, the term "to" does not limit the associated operation to being directly to. Thus, for example, transmitting an item "to" an entity may include transmitting an item directly to the entity or indirectly to the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated lists of embodiments:

1. A camera system, comprising:
   a camera monitoring database comprising:
      one or more user rated images; and
   a camera monitoring system controller configured to perform the following operations:
      conduct a camera liveness assessment, comprising:
         for each of one or more cameras:
            determining whether the camera has a direct network connection;
            in response to determining that the camera has a direct network connection, querying the camera for a network status of the camera;
            in response to determining that the camera has an indirect network connection, querying a network access device for the network status of the camera;
            determining, based on the querying of the camera or the network access device for the network status of the camera, the network status of the camera;
            in response to determining that the network status of the camera is offline, conducting a reset of the camera; and
            in response to determining that the network status of the camera is online:
               querying for an image captured by the camera;
               in response to receiving the image responsive to the querying for the image captured by the camera, determining an online/image status for the camera; and
               in response to not receiving the image responsive to the querying for the image captured by the camera:
                  determining an online/image-error status for the camera; and
                  conducting a reset of the camera; and
      conduct, in response to receiving the image responsive to the querying for the image captured by the camera, an image quality assessment, the image quality assessment, comprising:
         identifying a set of rated images comprising one or more images captured by the camera and associated with an image rating;
         comparing the image received to the set of rated images to determine whether the image received is similar to one or more rated images of the set of rated images;
         in response to determining that the image received is similar to a rated image of the set of rated images, determining a quality rating of the image received that corresponds the quality rating of the rated image; and
         in response to determining that the image received is not similar to any of the rated images of the set of rated images, conducting a quality scoring of the received image to determine a quality rating of the image received.

2. The system of embodiment 1, the operations further comprising:
   generating a camera system health report comprising:
      for each of the one or more cameras, an indication of the status determined for the camera; and
      for each camera for which an image is received, the quality rating of the image received.

3. The system of embodiment 2, the operations further comprising:
   conducting, based on the camera system health report, corrective actions for the one or more cameras.

4. The system of any one of embodiments 1-3, wherein the quality rating of a rated image is based on a user submitted image quality rating.

5. The system of embodiment 4, the operations further comprising:
   receiving the user submitted image quality rating by way of an interactive interface of a camera system health report.

6. The system of any one of embodiments 1-5, wherein determining that the image received is similar to a rated image of the set of rated images comprises determining a plurality of images that are similar to the image received and determining the rated image is most similar to the image received.

7. The system of any one of embodiments 1-6, the operations further comprising:
   determining whether the rating of the image received satisfies a threshold rating; and
   in response to determining that the rating of the image received does not satisfy the threshold rating, generating an image quality alert indicative that the rating of the image received does not satisfy the threshold rating.

8. The system of any one of embodiments 1-7, wherein comparing the image received to the set of rated images to determine whether the image received is similar to a rated image of the set of rated images comprises conducting feature matching of the image received to rated images of the set of rated images to determine whether the image received is similar to any rated images of the set of rated images.

9. The system of any one of embodiments 1-8, the operations further comprising:
   in response to not receiving the image responsive to the querying for the image captured by the camera:
      attempting to establish communication with the camera by way of a network address for the camera;
      in response to establishing communication with the camera by way of the network address for the camera, determining a camera network status of online for the camera, wherein the online/image-error status for the camera comprises an online/software-error status; and
      in response to not establishing communication with the camera by way of the network address of the camera, determining a camera network status of offline for the camera.

10. A non-transitory computer readable storage medium comprising program instructions stored thereon that are executable by a processor to cause the following operations for camera monitoring:
   conducting a camera liveness assessment, comprising:
      for each of one or more cameras of a camera system:
         determining whether the camera has a direct network connection;
         in response to determining that the camera has a direct network connection, querying the camera for a network status of the camera;
         in response to determining that the camera has an indirect network connection, querying a network access device for the network status of the camera;
         determining, based on the querying of the camera or the network access device for the network status of the camera, the network status of the camera;

in response to determining that the network status of the camera is offline, conducting a reset of the camera; and in response to determining that the network status of the camera is online:

querying for an image captured by the camera; and in response to receiving the image responsive to the querying for the image captured by the camera, determining an online/image status for the camera;

in response to not receiving the image responsive to the querying for the image captured by the camera:

determining an online/image-error status for the camera; and conducting a reset of the camera; and conduct, in response to receiving the image responsive to the querying for the image captured by the camera, an image quality assessment, the image quality assessment, comprising:

identifying a set of rated images comprising one or more images captured by the camera and associated with an image rating;

comparing the image received to the set of rated images to determine whether the image received is similar to one or more rated images of the set of rated images; and in response to determining that the image received is similar to a rated image of the set of rated images, determining a quality rating of the image received that corresponds the quality rating of the rated image; and in response to determining that the image received is not similar to any of the rated images image of the set of rated images, conducting a quality scoring of the received image to determine a quality rating of the image received.

11. The medium of embodiment 10, the operations further comprising:

generating a camera system health report comprising:

for each of the one or more cameras, an indication of the status determined for the camera; and for each camera for which an image is received, the quality rating of the image received.

12. The medium of embodiment 11, the operations further comprising:

conducting, based on the camera system health report, corrective actions for the one or more cameras.

13. The medium of any one of embodiments 10-12, wherein the quality rating of a rated image is based on a user submitted image quality rating.

14. The medium of embodiment 13, the operations further comprising:

receiving the user submitted image quality rating by way of an interactive interface of a camera system health report.

15. The medium of any one of embodiments 10-14, wherein determining that the image received is similar to a rated image of the set of rated images comprises determining a plurality of images that are similar to the image received and determining the rated image is most similar to the image received.

16. The medium of any one of embodiments 10-15, the operations further comprising:

determining whether the rating of the image received satisfies a threshold rating; and in response to determining that the rating of the image received does not satisfy the threshold rating, generating an image quality alert indicative that the rating of the image received does not satisfy the threshold rating.

17. The medium of any one of embodiments 10-16, wherein comparing the image received to the set of rated images to determine whether the image received is similar to a rated image of the set of rated images comprises conducting feature matching of the image received to rated images of the set of rated images to determine whether the image received is similar to any rated images of the set of rated images.

18. The medium of any one of embodiments 10-17, the operations further comprising:

in response to not receiving the image responsive to the querying for the image captured by the camera:

attempting to establish communication with the camera by way of a network address for the camera;

in response to establishing communication with the camera by way of the network address for the camera, determining a camera network status of online for the camera, wherein the online/image-error status for the camera comprises an online/software-error status; and in response to not establishing communication with the camera by way of the network address of the camera, determining a camera network status of offline for the camera.

19. A camera monitoring method, comprising:

conducting a camera liveness assessment, comprising:

for each of one or more cameras of a camera system:

determining that the camera has a direct network connection;

in response to determining that the camera has a direct network connection, querying the camera for a network status of the camera;

determining, based on the querying of the camera for the network status of the camera, the network status of the camera;

in response to determining that the network status of the camera is online: querying for an image captured by the camera; and in response to receiving the image responsive to the querying for the image captured by the camera, determining an online/image status for the camera; and conducting, in response to receiving the image responsive to the querying for the image captured by the camera, an image quality assessment, the image quality assessment, comprising:

identifying a set of rated images comprising one or more images captured by the camera and associated with an image rating;

comparing the image received to the set of rated images to determine that the image received is similar to one or more rated images of the set of rated images; and in response to determining that the image received is similar to a rated image of the set of rated images, determining a quality rating of the image received that corresponds the quality rating of the rated image.

What is claimed is:

1. A camera system, comprising:

a camera monitoring database comprising:

one or more user rated images; and a camera monitoring system controller configured to perform the following operations:

conduct a camera liveness assessment, comprising:
for each of one or more cameras:
    determining whether the camera has a direct network connection;
    in response to determining that the camera has a direct network connection, querying the camera for a network status of the camera;
    in response to determining that the camera has an indirect network connection, querying a network access device for the network status of the camera;
    determining, based on the querying of the camera or the network access device for the network status of the camera, the network status of the camera;
    in response to determining that the network status of the camera is offline, conducting a reset of the camera; and
    in response to determining that the network status of the camera is online:
        querying for an image captured by the camera;
        in response to receiving the image responsive to the querying for the image captured by the camera, determining an online/image status for the camera; and
        in response to not receiving the image responsive to the querying for the image captured by the camera:
            determining an online/image-error status for the camera; and
            conducting a reset of the camera; and
conduct, in response to receiving the image responsive to the querying for the image captured by the camera, an image quality assessment, the image quality assessment, comprising:
    identifying a set of rated images comprising one or more images captured by the camera and associated with an image rating;
    comparing the image received to the set of rated images to determine whether the image received is similar to one or more rated images of the set of rated images;
    in response to determining that the image received is similar to a rated image of the set of rated images, determining a quality rating of the image received that corresponds the quality rating of the rated image; and
    in response to determining that the image received is not similar to any of the rated images of the set of rated images, conducting a quality scoring of the received image to determine a quality rating of the image received.

2. The system of claim 1, the operations further comprising:
generating a camera system health report comprising:
    for each of the one or more cameras, an indication of the status determined for the camera; and
    for each camera for which an image is received, the quality rating of the image received.

3. The system of claim 2, the operations further comprising:
conducting, based on the camera system health report, corrective actions for the one or more cameras.

4. The system of claim 1, wherein the quality rating of a rated image is based on a user submitted image quality rating.

5. The system of claim 4, the operations further comprising:
receiving the user submitted image quality rating by way of an interactive interface of a camera system health report.

6. The system of claim 1, wherein determining that the image received is similar to a rated image of the set of rated images comprises determining a plurality of images that are similar to the image received and determining the rated image is most similar to the image received.

7. The system of claim 1, the operations further comprising:
determining whether the rating of the image received satisfies a threshold rating; and
in response to determining that the rating of the image received does not satisfy the threshold rating, generating an image quality alert indicative that the rating of the image received does not satisfy the threshold rating.

8. The system of claim 1, wherein comparing the image received to the set of rated images to determine whether the image received is similar to a rated image of the set of rated images comprises conducting feature matching of the image received to rated images of the set of rated images to determine whether the image received is similar to any rated images of the set of rated images.

9. The system of claim 1, the operations further comprising:
in response to not receiving the image responsive to the querying for the image captured by the camera:
    attempting to establish communication with the camera by way of a network address for the camera;
    in response to establishing communication with the camera by way of the network address for the camera, determining a camera network status of online for the camera, wherein the online/image-error status for the camera comprises an online/software-error status; and
    in response to not establishing communication with the camera by way of the network address of the camera, determining a camera network status of offline for the camera.

10. A non-transitory computer readable storage medium comprising program instructions stored thereon that are executable by a processor to cause the following operations for camera monitoring:
conducting a camera liveness assessment, comprising:
    for each of one or more cameras of a camera system:
        determining whether the camera has a direct network connection;
        in response to determining that the camera has a direct network connection, querying the camera for a network status of the camera;
        in response to determining that the camera has an indirect network connection, querying a network access device for the network status of the camera;
        determining, based on the querying of the camera or the network access device for the network status of the camera, the network status of the camera;
        in response to determining that the network status of the camera is offline, conducting a reset of the camera; and in response to determining that the network status of the camera is online:
  querying for an image captured by the camera; and
  in response to receiving the image responsive to the querying for the image captured by the camera, determining an online/image status for the camera; and
  in response to not receiving the image responsive to the querying for the image captured by the camera:
    determining an online/image-error status for the camera; and
    conducting a reset of the camera; and
conduct, in response to receiving the image responsive to the querying for the image captured by the camera, an image quality assessment, the image quality assessment, comprising:
  identifying a set of rated images comprising one or more images captured by the camera and associated with an image rating;
  comparing the image received to the set of rated images to determine whether the image received is similar to one or more rated images of the set of rated images; and
  in response to determining that the image received is similar to a rated image of the set of rated images, determining a quality rating of the image received that corresponds the quality rating of the rated image; and
  in response to determining that the image received is not similar to any of the rated images image of the set of rated images, conducting a quality scoring of the received image to determine a quality rating of the image received.

11. The medium of claim 10, the operations further comprising:
  generating a camera system health report comprising:
    for each of the one or more cameras, an indication of the status determined for the camera; and
    for each camera for which an image is received, the quality rating of the image received.

12. The medium of claim 11, the operations further comprising:
  conducting, based on the camera system health report, corrective actions for the one or more cameras.

13. The medium of claim 10, wherein the quality rating of a rated image is based on a user submitted image quality rating.

14. The medium of claim 13, the operations further comprising:
  receiving the user submitted image quality rating by way of an interactive interface of a camera system health report.

15. The medium of claim 10, wherein determining that the image received is similar to a rated image of the set of rated images comprises determining a plurality of images that are similar to the image received and determining the rated image is most similar to the image received.

16. The medium of claim 10, the operations further comprising:
  determining whether the rating of the image received satisfies a threshold rating; and
  in response to determining that the rating of the image received does not satisfy the threshold rating, generating an image quality alert indicative that the rating of the image received does not satisfy the threshold rating.

17. The medium of claim 10, wherein comparing the image received to the set of rated images to determine whether the image received is similar to a rated image of the set of rated images comprises conducting feature matching of the image received to rated images of the set of rated images to determine whether the image received is similar to any rated images of the set of rated images.

18. The medium of claim 10, the operations further comprising:
  in response to not receiving the image responsive to the querying for the image captured by the camera:
    attempting to establish communication with the camera by way of a network address for the camera;
    in response to establishing communication with the camera by way of the network address for the camera, determining a camera network status of online for the camera, wherein the online/image-error status for the camera comprises an online/software-error status; and
    in response to not establishing communication with the camera by way of the network address of the camera, determining a camera network status of offline for the camera.

19. A camera monitoring method, comprising:
  conducting a camera liveness assessment, comprising:
    for each of one or more cameras of a camera system:
      determining that the camera has a direct network connection;
      in response to determining that the camera has a direct network connection, querying the camera for a network status of the camera;
      determining, based on the querying of the camera for the network status of the camera, the network status of the camera;
      in response to determining that the network status of the camera is online: querying for an image captured by the camera; and
      in response to receiving the image responsive to the querying for the image captured by the camera, determining an online/image status for the camera; and
  conducting, in response to receiving the image responsive to the querying for the image captured by the camera, an image quality assessment, the image quality assessment, comprising:
    identifying a set of rated images comprising one or more images captured by the camera and associated with an image rating;
    comparing the image received to the set of rated images to determine that the image received is similar to one or more rated images of the set of rated images; and
    in response to determining that the image received is similar to a rated image of the set of rated images, determining a quality rating of the image received that corresponds the quality rating of the rated image.

* * * * *